(12) United States Patent
Sakakibara

(10) Patent No.: US 9,776,464 B2
(45) Date of Patent: Oct. 3, 2017

(54) ANTI-SKID DEVICE FOR TIRE AND MAIN BODY FOR ANTI-SKID DEVICE FOR TIRE

(71) Applicant: Kouichi Sakakibara, Gifu-Ken (JP)

(72) Inventor: Kouichi Sakakibara, Gifu-Ken (JP)

( * ) Notice: Subject to any disclaimer, the term of this patent is extended or adjusted under 35 U.S.C. 154(b) by 0 days.

(21) Appl. No.: 14/585,991

(22) Filed: Dec. 30, 2014

(65) Prior Publication Data

US 2015/0191061 A1    Jul. 9, 2015

(30) Foreign Application Priority Data

Jan. 9, 2014 (JP) ................................. 2014-002162
May 15, 2014 (JP) ................................. 2014-101734

(51) Int. Cl.
*B60C 27/20* (2006.01)
*B60C 27/02* (2006.01)

(52) U.S. Cl.
CPC .............. *B60C 27/20* (2013.01); *B60C 27/02* (2013.01); *B60C 27/0292* (2013.01)

(58) Field of Classification Search
CPC ...... B60C 27/02; B60C 27/20; B60C 27/0292
See application file for complete search history.

(56) References Cited

U.S. PATENT DOCUMENTS

| | | | |
|---|---|---|---|
| 1,285,406 A | * | 11/1918 | Sangoff .................... B60C 27/20 152/182 |
| 1,621,883 A | * | 3/1927 | Hodgson ................. B60C 27/02 152/225 R |
| 1,719,746 A | * | 7/1929 | Baker ..................... B60C 27/02 152/210 |
| 3,198,233 A | | 8/1965 | Aler |

(Continued)

FOREIGN PATENT DOCUMENTS

| | | |
|---|---|---|
| JP | S35-028806 | 10/1960 |
| JP | S49-002043 B | 1/1974 |

(Continued)

OTHER PUBLICATIONS

Notification of Reasons for Refusal in Japanese Appeal No. 2015-17068 (Application No. 2014-257673) dated Oct. 27, 2015.

(Continued)

*Primary Examiner* — Kip T Kotter
(74) *Attorney, Agent, or Firm* — Michael Best & Friedrich LLP

(57) ABSTRACT

An anti-skid device includes a first main body and a second main body disposed rearward of the first main body, both of which are made of elastic material. The first main body has: a first ground-contactable sheet-like part that elongates in a circumferential direction; an inside rear connecting part provided at rear side of the first ground-contactable sheet-like; and an outside front connecting part provided at front side of the first ground-contactable sheet-like part. The second main body has: a second ground-contactable sheet-like part that elongates in the circumferential direction; an inside front connecting part provided at front side of the second ground-contactable sheet-like part; and an outside rear connecting part provided at rear side of the second ground-contactable sheet-like part. The inside rear connecting part of the first main body and the inside front connecting part of the second main body are connectable with each other.

22 Claims, 15 Drawing Sheets

(56) References Cited

U.S. PATENT DOCUMENTS

| | | | | |
|---|---|---|---|---|
| 3,323,572 | A | * | 6/1967 | Farah .................. B60C 27/02 152/208 |
| 3,937,262 | A | * | 2/1976 | Lee ..................... B60C 27/02 152/179 |
| 4,825,923 | A | * | 5/1989 | Blankenship ......... B60C 27/10 152/213 A |
| 4,862,937 | A | | 9/1989 | Nakajima |
| 5,088,534 | A | * | 2/1992 | Engel .................. B60C 11/14 152/176 |
| 6,619,353 | B1 | * | 9/2003 | Kim .................... B60C 27/02 152/218 |
| 7,905,208 | B2 | | 3/2011 | Ruggiero |
| 2005/0146205 | A1 | * | 7/2005 | Sakakibara ........... B60C 27/04 301/41.1 |
| 2006/0225823 | A1 | * | 10/2006 | Fu ...................... B60C 27/20 152/221 |
| 2013/0292015 | A1 | * | 11/2013 | Sakakibara ........... B60C 27/04 152/208 |

FOREIGN PATENT DOCUMENTS

| | | |
|---|---|---|
| JP | S61-36407 U1 | 3/1986 |
| JP | S61-207203 A | 9/1986 |
| JP | S63-287609 A | 11/1988 |
| JP | H02-070512 A | 3/1990 |
| JP | H02-070512 A | 9/1990 |
| JP | H02-129906 U1 | 10/1990 |
| JP | 2521471 Y2 | 12/1996 |
| JP | 2003-507243 A | 2/2003 |
| JP | 2004-142692 A | 5/2004 |
| JP | 3557464 B2 | 8/2004 |
| JP | 2007-290627 A1 | 11/2007 |
| JP | 2008-094220 A1 | 4/2008 |
| JP | 2008-110680 A | 5/2008 |
| JP | 2008-273455 A | 11/2008 |
| JP | 2013-139197 A | 1/2010 |
| JP | 5017737 B1 | 9/2012 |
| JP | 2013-139197 A | 7/2013 |
| JP | 5253609 B1 | 7/2013 |
| JP | 5256309 B1 | 8/2013 |
| JP | 2014-019410 A | 2/2014 |

OTHER PUBLICATIONS

Office Action issued in Japanese Application No. 2014-002162, dated Apr. 1, 2014.
Office Action issued in Japanese Application No. 2014-101734, dated Jun. 10, 2014.
Office Action issued in Japanese Application No. 2014-101734, dated Oct. 14, 2014.
International Search Report issued in Application No. PCT/JP2014/063261, dated Jul. 29, 2014.
Search Report issued in Application No. PCT/JP2014/051860, dated Apr. 1, 2014.

* cited by examiner

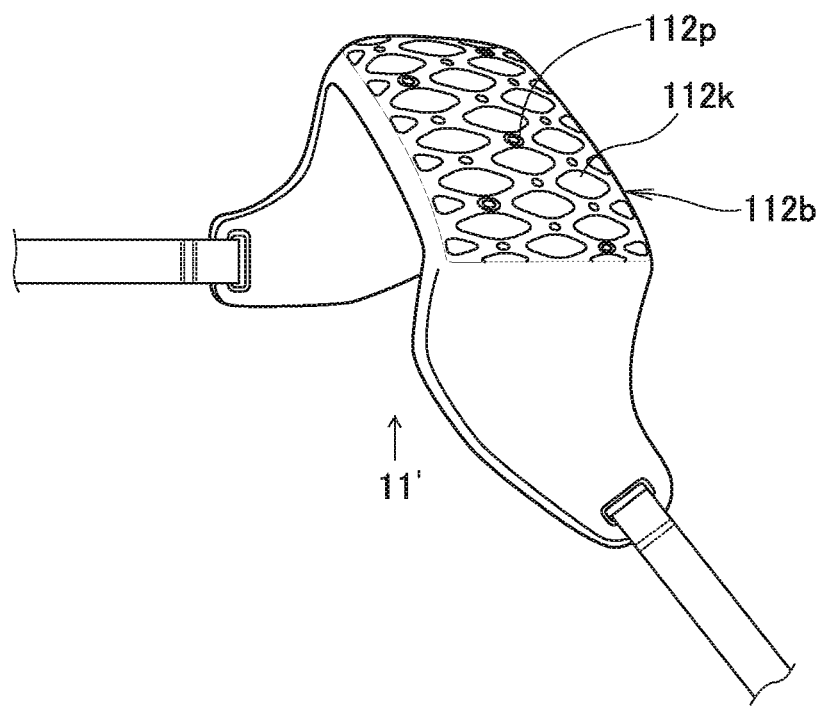
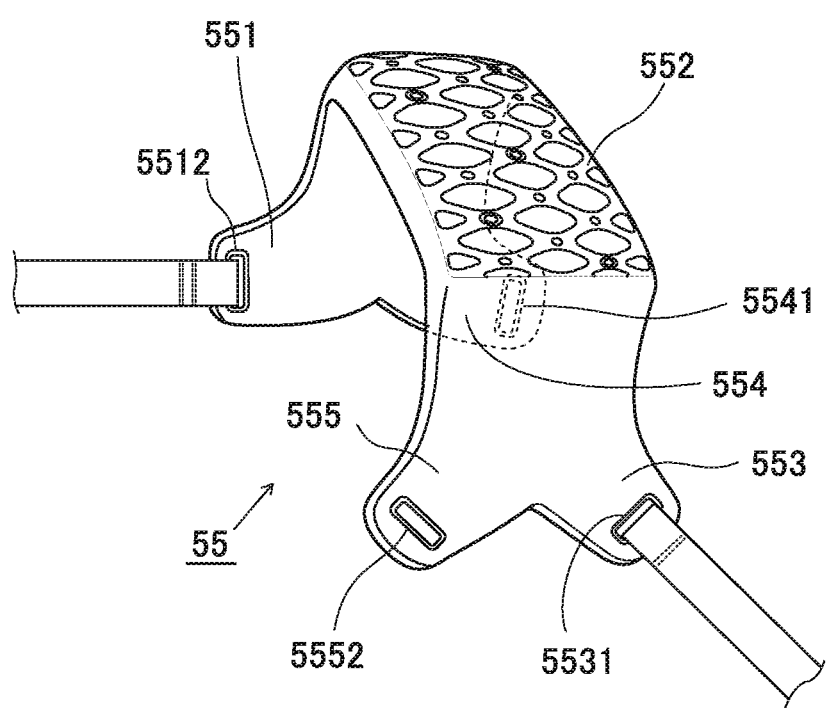

ent example
ANTI-SKID DEVICE FOR TIRE AND MAIN BODY FOR ANTI-SKID DEVICE FOR TIRE

BACKGROUND ART

The present invention relates to an anti-skid device for a tire that is attachable to a tire of a vehicle, such as a motor vehicle, and can prevent slip of the tire and other troubles on a winter road, such as snowy road and frozen road.

SUMMARY OF THE INVENTION

The anti-skid device according to the present invention includes a first main body and a second main body disposed to rearward of the first main body. The first and second main bodies are made of an elastic material. The first main body includes a first ground-contactable sheet-like part that elongates in a circumferential direction; a first inside rear connecting part that merges into the first ground-contactable sheet-like part at a rear side and an inside of the first ground-contactable sheet-like part; and a first outside front connecting part that merges into the first ground-contactable sheet-like part at an outside and a front side of the first ground-contactable sheet-like part. The second main body includes: a second ground-contactable sheet-like part that elongates in the circumferential direction; a second inside front connecting part that merges into the second ground-contactable sheet-like part and is arranged at an inside and a front side of the second ground-contactable sheet-like part; and a second outside rear connecting part that merges into the second ground-contactable sheet-like part at an outside and a rear side of the second ground-contactable sheet-like part. The first inside rear connecting part and the second inside front connecting part are connectable with each other.

According to the anti-skid device of the present invention, each elementary unit is configured such that the first main body and the second main body are connected with each other via the inside rear connecting part and the inside front connecting part, and at least one or more of elementary units may be connected or released via adjacent outside front connecting part and outside rear connecting part thereby to allow the device to be easily attached to or detached from the tire.

BRIEF DESCRIPTION OF THE DRAWINGS

FIG. 9 is a perspective view illustrating anti-skid patterns and anti-skid pieces provided on the outer surface of a ground-contactable sheet-like part.

FIG. 10 is a perspective view illustrating another example of a unified main body.

DESCRIPTION OF EMBODIMENTS

Figure 1:
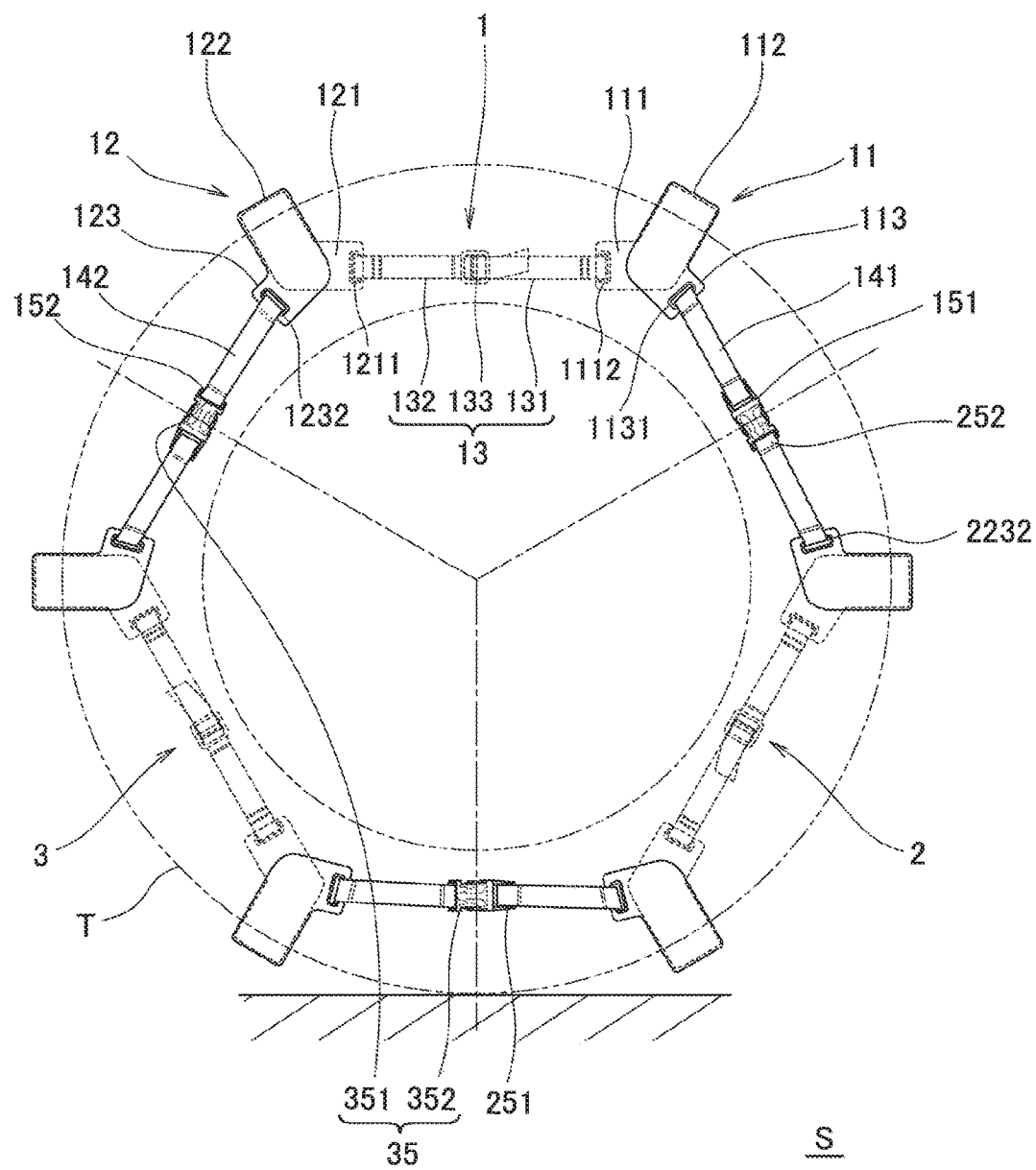
FIG. 1 is a front elevational view illustrating an appearance that an anti-skid device for tires according to a first example is attached to a tire.

One or more features freely selected from the present description may be added to the above-described features of the present invention. Which embodiment is the best or not is different in accordance with objectives, required performance and other factors.

The terms "first" and "second," "front side" and "rear side," and "frontward" and "rearward" as referred to in the present description are merely expressions for descriptive purposes. Unless otherwise stated in the present description, the direction in which the tire rotates when the vehicle runs forward means the "frontward," whereas the opposite direction thereto means the "rearward." The "front side" of the ground-contactable sheet-like part means a location in the vicinity of the front end of the ground-contactable sheet-like part (in particular in the vicinity of the sidewall part) or a further frontward location, rather than meaning the front part of the ground-contactable sheet-like part itself. The same applies to the "rear side" of the ground-contactable sheet-like part. For example, the inside rear connecting part according to the present invention is provided at a location in the vicinity of the rear end of the first ground-contactable sheet-like part or a further rearward location while facing the inside sidewall part of the tire. Note that each connecting part facing the sidewall part is not necessarily in a sheet-like form, different from each ground-contactable sheet-like part.

The "inside" as used in the present description refers to the side of a vehicle, whereas the "outside" refers to the opposite side thereto i.e., the non-vehicle side (or the side of the decorative surface of a wheel). Vehicles to which the anti-skid device according to the present invention is attached may be motor vehicles (including wagons), industrial vehicles and other vehicles as well as two-wheel vehicles and the like. In the case of two-wheel vehicles, the "inside" may be read as "right side" and the "outside" as "left side."

Main Body

As long as each main body has a ground-contactable sheet-like part and connecting parts as defined in the present invention, detailed form of the main body is not limited. For example, each main body may comprise a U-shaped main body (U-shaped portion) that has: an inside sheet-like part that merges into an inside shoulder part of the ground-contactable sheet-like part and elongates in the circumferential direction while facing the inside sidewall part; and an outside sheet-like part that merges into an outside shoulder part of the ground-contactable sheet-like part and elongates in the circumferential direction while facing the outside sidewall part, wherein the U-shaped main body has a cross-section that is approximately in a U-shape (open-channel-like, groove-like). This configuration is preferred because the holding ability, the attachability and other appropriate properties are improved. The ground-contactable sheet-like part and the inside sheet-like part or the outside sheet-like part may have a constant thickness as a whole. However, only the ground-contactable sheet-like part, which will contact with the road surface, may have a larger thickness than those of the sheet-like parts at both sides. This allows the anti-skid device to have both the anti-skid ability and the durability. Note that the shoulder part of the ground-contactable sheet-like part refers to a part located in the vicinity of an inside end part or an outside end part of the ground-contactable sheet-like part which corresponds to the tread part of the tire, and that part corresponds to a shoulder part of the tire.

The inner width of the U-shaped main body may be constant or may vary. For example, the inner width at the opening side (at the side of the front end of the side sheet-like part) may be expanded or contracted than the inner width at the bottom side (at the side of the ground-contactable sheet-like part). If the opening side is wider than the bottom side, the attachability of the U-shaped main body to the tire is improved. If, in contrast, the opening side is narrower than the bottom side, the holding ability of the U-shaped main body to the tire is improved. Note that, even when the opening side is narrower than the bottom side, the attachability can be sufficiently ensured because the U-shaped main body is formed of elastic material.

When the first main body comprises a first ground-contactable sheet-like part, a first inside sheet-like part and a first outside sheet-like part, and the second main body comprises a second ground-contactable sheet-like part, a second inside sheet-like part and a second outside sheet-like part, the inside rear connecting part may be provided at a rear part of the first inside sheet-like part, the outside front connecting part may be provided at a front part of the first outside sheet-like part, the inside front connecting part may be provided at a front part of the second inside sheet-like part, and the outside rear connecting part may be provided at a rear part of the second outside sheet-like part.

The main body according to the present invention may have an abutting part at the connecting part or in the vicinity thereof. The abutting part contacts with the sidewall part of the tire. This allows the main body to be stably and easily held by the sidewall part of the tire, and the wheel is prevented from being damaged by the main body and the like. The abutting part may also be a thick part or the like which protrudes to the side of the sidewall part of the tire (so as to be directed toward the sidewall). The connecting part can be reinforced by the circumference of the connecting part having a large thickness.

In the elementary unit, arrangement of the connecting parts provided on respective main bodies that constitute the elementary unit may be different. Therefore, the main bodies may not have the same shape in general, so that main bodies having different forms may be required in one elementary unit.

However, it is possible to use a unified main body that comprises: a ground-contactable sheet-like part that is to be the first ground-contactable sheet-like part or the second ground-contactable sheet-like part; and four connecting parts that are each to be any of the inside rear connecting part, the outside front connecting part, the inside front connecting part, or the outside rear connecting part. In this case, unified main bodies of one type (the same shape) can be used to configure the elementary unit because the form of the unified main body can be shared by the first main body and the second main body. In addition, if the unified main body has a shape that is symmetrical with respect to the longitudinal direction (rear-front direction that crosses the ground-contactable sheet-like part, i.e., circumferential direction) or the lateral direction (outside-inside direction that crosses the ground-contactable sheet-like part), the assembling ability and the handling ability can be further improved. By using such unified bodies, the production cost and the management cost of the anti-skid device can be further reduced.

Here, it is preferred that the extent that the ground-contactable sheet-like part or each side sheet-like part "elongates" in the circumferential direction is adjusted depending on a range (length) of a grounding region (deformed area in terms of the aspect ratio) between the tire and the road surface. For example, the ground-contactable sheet-like part or each side sheet-like part may preferably elongate within a range of 10 to 60 degrees, more preferably 20 to 50 degrees, and further preferably 25 to 45 degrees, in terms of an angle centered on the rotation center of the tire (wheel). This elongating angle is, when the anti-skid device is attached to a tire of a reference size (theoretical value) to which the anti-skid device is expected to be attached, an angle (included angle) between a line segment that connects the rotation center of the tire and one end of the ground-contactable sheet-like part in the circumferential direction and a segment that connects the rotation center and the other end of the ground-contactable sheet-like part. The side sheet-like part may be present within an appropriate range that corresponds to the ground-contactable sheet-like part, and their elongating angles may not necessarily be strictly the same.

The main body according to the present invention can be stably held by the connecting parts (the inside rear connecting part and the outside front connecting part or the inside front connecting part and the outside rear connecting part) which are obliquely (diagonally) arranged across the tread part of the tire. In this case, as each connecting part is located at a position separated in the circumferential direction from the center line (center line in the wheel axis direction) that crosses the ground-contactable sheet-like part, the recovering force acting on the main body tends to be large, so that the attitude of the main body will be more stable. From such a viewpoint, it is preferred to provide extending portions that extend in the circumferential direction, integrally with the connecting parts or independently.

More specifically, it is preferred that the first main body further has: an inside rear extending portion that extends rearward with respect to the first ground-contactable sheet-like part at inside of the tire (e.g., while facing the inside sidewall part); and an outside front extending portion that extends frontward with respect to the first ground-contactable sheet-like part at outside of the tire (e.g., while facing the outside sidewall part), and the second main body has: an inside front extending portion that extends frontward with respect to the second ground-contactable sheet-like part at inside of the tire; and an outside rear extending portion that extends rearward with respect to the second ground-contactable sheet-like part at outside of the tire. When the unified main body is used, it may preferably have four extending portions that each act as any of the inside rear connecting part, the inside front connecting part, the outside rear connecting part, and the outside front connecting part.

The connecting parts may be disposed independently of the extending portions, but may preferably be disposed at the extending portions because in this case the shape of the main body may be simplified so that the main body can be held stably. More specifically, it is preferred that: the inside rear connecting part is provided at the inside rear extending portion; the outside front connecting part is provided at the outside front extending portion; the inside front connecting part is provided at the inside front extending portion; and the outside rear connecting part is provided at the outside rear extending portion.

The ground-contactable sheet-like part may preferably be provided with grooves, depressions (recesses) or holes (pockets) at the side of the outer surface thereof as necessary to enhance the anti-skid ability and water discharge ability of the anti-skid device. For example, in view of the stiffness and anti-skid ability of the ground-contactable sheet-like part, one or more elongate holes (depressions) elongating in the wheel axis direction (outside-inside direction that crosses the tread part of the tire) may be provided at the side of the outer surface of the ground-contactable sheet-like part. Not only when the form of the outer circumferential surface of the ground-contactable sheet-like part (tread pattern) is modified, but when anti-skid protrusions (e.g., protrusions molded integrally with the ground-contactable sheet-like part) and/or anti-skid pieces are present at the side of the outer circumferential surface of the ground-contactable sheet-like part, the anti-skid ability of the anti-skid device can be further improved. The anti-skid pieces may be metallic pins or studs or the like, for example, which may preferably protrude slightly from the outer circumferential surface of the ground-contactable sheet-like part. Furthermore, engaging protrusions or engaging pieces may also be provided at the side of the inner circumferential surface of the ground-contactable sheet-like part. This allows the main body to be prevented from sliding also with respect to the tire, thereby to further improve the holding ability of the anti-skid device to the tire. The surface to be provided with those and the protruding direction are reversed, but the engaging protrusions and the anti-skid protrusions, or the engaging pieces and the anti-skid pieces, may have the same structure. The inner circumferential surface of the ground-contactable sheet-like part does not directly contact with the road surface unlike the outer circumferential surface, and less abrasion or the like may occur. Therefore, the engaging pieces may be substituted with an engaging sheet that enhances the frictional resistance between contacting surfaces.

The ground-contactable sheet-like part according to the present invention may have a continuous sheet-like form, a mesh-like form, an irregular form, a discontinuous form that comprises a plurality of bridging parts (belt-like parts) provided across the tread part of the tire, or other appropriate form. When the discontinuous form is employed, if it is configured such that the outer circumferential surface of the tire is not exposed between the bridging parts, the main body will be formed in a compact form, and the attachability, holding ability, durability and other appropriate properties can be achieved, thus preferred. The ground-contactable sheet-like part has a predetermined length to contact with the outer circumferential surface of the tire (contact length) along the circumferential direction of the tire. The (total) contact length cannot be specified unconditionally, but is much longer than that of the conventional steel rod and the like. For example, the contact length may be 4 cm or more, or 6 cm or more, or may be a length that corresponds to 10 degrees or more as the above-described elongating angle. The ground-contactable sheet-like part has a certain contact length, so it can also be said to be a belt-like part, a plate-like part, a sheeted part, or the like. This also applies to the side sheet-like part. The ground-contactable sheet-like part may have a curved form that corresponds to the outer circumferential surface of the tire (arc shape in the cross-section in the circumferential direction).

The connecting part may be a part to which a belt-like connecting body such as formed of a belt or an elastic connecting body such as formed of rubber is connected. The form of the connecting part is not limited, but it is preferred that the connecting part has a shape (e.g., pocket-like, hole-like (in particular elongate hole-like), engaging hook-like, and the like) which allows easy connection of each connecting body, such as insertion, insertion to fit, and engaging, and which can stably hold the connecting body while ensuring the stiffness, strength and other appropriate mechanical properties of the main body. The connecting part may be directly formed on or in the main body, or may be indirectly formed by fixing the connecting part, such as a ring (adapter), to the main body using an appropriate fixing means (such as rivet).

The main body is formed of elastic material, such as resin, rubber or similar elastomer, and composite material. The elastic material refers to a material that causes deformation (strain) when an external force (stress) is applied thereto and that has a property of being restored when the external force is removed. The elastic material according to the present invention is a material that, even when the material is attached to a tire which significantly deforms during the running, can follow the deformation. Specifically, the elastic material according to the present invention can be, as stated above, rubber (including elastomer), synthesized resin, composite material thereof, or the like, rather than being stiff material such as steel material. Different from those of steel material and the like, the main bodies formed of such elastic material are excellent in rust preventive property, weatherability, easy exchangeability, disposability, productivity and other properties. Moreover, when the vehicle runs with tires to which the anti-skid devices using such main bodies are attached, the noise and vibration to occur can be suppressed from increasing, and the ride quality is unlikely to degrade.

When the main body comprises an integrally molded body of elastic material obtained such as by injection molding, the mass production is possible, and it is thus easy to reduce the production cost of the anti-skid device.

It is preferred that the elastic material is resin or rubber (including elastomer), for example. The rubber may be a hard rubber that is the same material for a tire, for example. The elastic material may also be a composite material that comprises a metallic core material and a covering material formed of resin, rubber or other appropriate material to clad the core material. The elastic material comprising such a composite material may make it easy to ensure the stiffness and strength of the main body owing to the core material, so that the adjustment of the total thickness, the thickness distribution or the like can be easily performed using the covering material such as formed of rubber. When the outer surface of the main body is formed of resin or rubber, at least corrosion prevention is unnecessary, and the storage ability can therefore be improved. Moreover, when the outer surface of the main body is formed of rubber or other appropriate material, the wheel and other components are unlikely to be damaged when the anti-skid device is attached to the tire, thus preferred. It may be difficult to generally define the elastic material according to the present invention, but in daring to describe, the elastic modulus (Young's modulus) may preferably be 0.01 to 10 GPa, and more preferably 0.1 to 5 GPa, for example. Thus, the elastic material according to the present invention may preferably be material having elasticity (deformability and restoring ability) that can respond to a large deformation of a tire, rather than being stiff material such as steel material.

Connecting Body/Connector

The connecting body or the connector according to the present invention connects between inside connecting parts (the inside rear connecting part and the inside front connecting part) or between outside connecting parts (the outside rear connecting part and the outside front connecting part). It is preferred that the inside connecting body (which may include the connector) or the outside connecting body (which may include the connector) has flexibility or stretchability to such an extent that at least the deformation of the main body connected by the connecting body or the connector is not strongly constrained, in order that the main body can easily follow the tire to deform. Various kinds of the form of each connecting body may be considered. For example, when a flexible belt-like connecting body is employed, its handling ability is good, and the anti-skid device can be provided with improved attaching ability at low cost, or with other advantages. In this case, if the adjuster or the like to be described later is used, the connecting length (length between the connecting parts) can be easily adjusted. This allows compatible use of the anti-skid device. That is, even though the anti-skid device is responsible for the same tire width (tread width), the device can easily be attached to a variety of tires having different aspect ratios or different rim diameters.

Specifically, the belt-like connecting body may preferably comprise a belt that has excellent properties such as strength and weatherability. The connecting body as referred to in the present description may preferably comprise an adjuster that can adjust its length in a stepless manner or in a stepwise manner. Examples of such an adjuster include a strap adjuster ("Koki"). Examples of a connecting adjuster that acts as both the connector and the adjuster include a cam buckle.

Method of connecting between the connecting body and the connecting part of the main body is not limited. For example, the end part of the connecting body may be inserted into the connecting part to establish the connection such as by sewing. In an alternative embodiment, the belt-like connecting body and the connecting part may be connected via appropriate means such as a variety of buckles and length-adjustable strap adjusters (insertion for attaching, tightening, securing or the like).

Thus, the anti-skid device according to the present invention may preferably have a flexible or stretchable inside belt-like connecting body that connects between the inside rear connecting part and the inside front connecting part. It is also preferred that an inside length adjuster is provided which adjusts the connecting length of the inside belt-like connecting body. These aspects also apply to those between the outside connecting parts. The anti-skid device according to the present invention may preferably comprise: an outside front belt-like connecting body that comprises a connectable/disconnectable connector and connects between the outside front connecting part and one end part of the connectable/disconnectable connector; and an outside rear connecting body that connects between the outside rear connecting part and the other end part of the connectable/disconnectable connector, wherein the connectable/disconnectable connector is divided into respective parts provided at the outside front connecting part and the outside rear connecting part and is capable of connectable/disconnectable connection. The outside front belt-like connecting body or the outside rear belt-like connecting body may preferably have an outside length adjuster (which may also act as the connectable/disconnectable connector) that adjusts the connecting length. The outside front belt-like connecting body or the outside rear belt-like connecting body may also be referred to as an outside belt-like connecting body.

The connecting body according to the present invention is not limited to the above-described belt-like connecting body, and may also be an elastic connecting body formed of elastic material such as rubber and spring. That is, the anti-skid device according to the present invention may have a stretchable inside elastic connecting body that connects between the inside rear connecting part and the inside front connecting part. When the anti-skid device according to the present invention comprises two or more elementary units and each of the elementary units is configured such that the first main body and the second main body are connected with each other via the inside rear connecting part and the inside front connecting part, the elementary units may be connected with one another such that the outside front connecting part of one of adjacent elementary units is connected with the outside rear connecting part of the other of the adjacent elementary units. In such a case, the anti-skid device according to the present invention may preferably have a stretchable outside elastic connecting body that connects between the outside front connecting part and the outside rear connecting part. This allows each main body constituting the anti-skid device to more stably be fixed to the tire. If either of the belt-like connecting body or the elastic connecting body according to the present invention is employed, it may be enough, but both may be used in combination. The belt-like connecting body may be formed of elastic material to act also as the elastic connecting body.

Attaching and detaching of the anti-skid device may be performed by attaching and detaching of the connectable/disconnectable connector which is disposed at the outside of the tire. The type, structure, form and the like of the connectable/disconnectable connector are not limited, but it is preferred to use one which allows simple and quick attaching. Examples of such a connectable/disconnectable connector include: an engaging buckle configured such that an engaging hook provided pivotally on the buckle is inserted into an engaging hole provided in a belt; a so-called one-touch buckle that comprises a projection-type male plug for engagement and a rectangular female receptor for enclosing the male plug and is capable of one-touch attaching/detaching by means of an elastic lock mechanism (engaging part); a ratchet buckle that comprises a belt which has an irregular (teeth-like, wave-like) surface for engagement and a stopper (tab) which engages with the irregular surface of the belt and permits the belt to move in one direction; and a cam buckle that comprises an engaging cam pivotally provided in a housing (buckle), into which a belt is inserted, and biased in one direction (engaging direction) wherein the cam buckle is configured such that the engaging cam is operated to pivotally move in the reverse direction (released) thereby to release the belt. If an elastic connecting body is employed which can engage with a hook (engaging adapter) or the like provided on each connecting part, the stretching thereof may simply be utilized to perform the attaching/detaching of the anti-skid device.

A connectable/disconnectable connector may also be provided between the inside rear connecting part and the inside front connecting part. However, such a connector may be enough if it can adjust the connecting length because it is preferred that the attaching and detaching of the anti-skid device are performed while the inside rear connecting part and the inside front connecting part remain connected. It should be emphasized that the present invention does not exclude an anti-skid device configured such that the distance between the inside connecting parts and/or the distance between the outside connecting parts are fixed.

Elementary Unit

The anti-skid device according to the present invention uses the elementary unit as a basic unit, and the elementary unit is configured such that the first main body and the second main body are connected at the inside (via the inside rear connecting part and the inside front connecting part). While it may be considered that the anti-skid device is configured of one elementary unit, the anti-skid device may usually be configured such that two or more elementary units are combined.

In general, each elementary unit is used while two main bodies remain connected at the inside (at the back side when attached to a tire) except for when the inside connecting length is adjusted, or the like. It is preferred that the attaching and detaching of the anti-skid device are usually performed by the connection and disconnection of the connectable/disconnectable connector which is located at the outside.

An anti-skid device for small-sized vehicles such as light motor vehicles may have a set of two elementary units, for example, and the attaching and detaching of the anti-skid device can be performed by the connection and disconnection (attaching/detaching) of the connectable/disconnectable connector at one location. This feature also applies to the case of three or more elementary units. In this regard, one connectable/disconnectable connector according to the present invention may be enough for the anti-skid device as a whole for one tire, but may be provided for each elementary unit.

With regard to an anti-skid device for large-sized vehicles such as industrial motor vehicles, however, there may rather be a case of excellent attachability/detachability in which three elementary units are configured capable of being divided, for example, so that the connection and disconnection are possible at a plurality of locations using the connectable/disconnectable connectors. Moreover, if the connectable/disconnectable connector is provided for each elementary unit, then, two, three or four or more elementary units can be connected with one another to respond to a variety of vehicles (for which different rim diameters are assigned) to which the anti-skid device is to be attached, as long as the anti-skid device matches the same standard as that for the vehicle (i.e., the corresponding tire width is the same). This allows the number of standards and the number of components to be further reduced, and the production cost and the management cost can thus be more reduced.

EXAMPLES

First Example

Overview

FIG. 1 illustrates an appearance that an anti-skid device S for tires (referred simply to as an "anti-skid device S") as one example of the present invention is attached to a tire T for large-sized motor vehicles. The anti-skid device S comprises three elementary units 1, 2 and 3. The elementary units 1, 2 and 3, which have the same form, are connected with one another in connectable and disconnectable manner at the outside of the tire T (paper front side of FIG. 1), i.e., the side of the decorative surface of a wheel (not shown). One elementary unit 1 of these elementary units will hereinafter be described also with reference to FIG. 2, which is a wholly enlarged view of the elementary unit 1, and FIG. 3, which is a partially enlarged view of the elementary unit 1. Descriptions of other elementary units will be omitted. Similar members are denoted by the same reference numeral or character, and detailed descriptions thereof may be omitted.

Elementary Unit

The elementary unit 1 comprises a first main body 11, a second main body 12, an inside belt-like connecting body 13 (131, 132, 133), and an outside belt-like connecting body 14 (141, 142) that includes a connectable/disconnectable connector 15 (151, 152). As will be described later in detail, a fork-like male plug 151 that constitutes the connectable/disconnectable connector 15 of the elementary unit 1 is engaged with a rectangular female receptor 252 that constitutes a connectable/disconnectable connector 25 (251, 252) of the elementary unit 2. In the same manner, a rectangular female receptor 152 that constitutes the connectable/disconnectable connector 15 of the elementary unit 1 is engaged with a fork-like male plug 351 that constitutes a connectable/disconnectable connector 351 of the elementary unit 3. A fork-like male plug 352 constitutes a connectable/disconnectable connector 352 of the elementary unit 3. Note that the connectable/disconnectable connectors 15, 25, 351 and 352 are in the same form.

Main Body

The first main body 11 (first U-shaped main body) has an inside rear extending portion 111, a first U-shaped portion 112, and an outside front extending portion 113, which form a wide sheet-like body that is obtained by integrally molding hard rubber (polyurethane elastomer) approximately into a U-shape so as to be along the shape of the outer circumference side of the tire (approximately U-shaped cross-section). The first U-shaped portion 112 has an inside part 112a (first inside sheet-like part), a crossing part 112b (first ground-contactable sheet-like part), and an outside part 112c (first outside sheet-like part).

The inside part 112a elongates along the inside sidewall part of the tire T in the radial direction and circumferential direction thereof. The crossing part 112b merges into the inside part 112a so as to be gently curved outward with about 90 degrees from the inside part 112a; crosses the tread part of the tire T; and elongates along the outer circumferential surface of the tire T in the circumferential direction. The outside part 112c is gently curved with about 90 degrees from the crossing part 112b, and elongates along the outside sidewall part in the radial direction and circumferential direction thereof. The crossing part 112b has a larger thickness than those of other parts because the outermost surface of the crossing part 112b is to be a ground-contactable surface when it is attached to the tire T. In addition, a plurality of elongate anti-skid grooves 112g are formed at the side of the outermost surface of the crossing part 112b to extend in the axial direction of the wheel (perpendicular direction to the sheet of FIG. 1).

The inside rear extending portion 111 merges into the end part in the radial direction of the inside part 112a of the first U-shaped portion 112 so as to be gently curved to the rearward circumferential direction with about 90 degrees, and extends along the inside sidewall part. The outside front extending portion 113 merges into the end part in the radial direction of the outside part 112c of the first U-shaped portion 112 so as to be gently curved to the frontward circumferential direction with about 90 degrees, and extends along the outside sidewall part.

The rear end part of the inside rear extending portion 111 is formed with an inside rear connecting part 1112 that is provided with an elongated and reinforced hole along the radial direction of the tire. The front end part of the outside front extending portion 113 is also formed with an outside front connecting part 1131 that is provided with an elongated and reinforced hole (slit) along the radial direction of the tire.

The second main body 12 (second U-shaped main body) has an inside front extending portion 121, a second U-shaped portion 122, and an outside rear extending portion 123, which form a wide sheet-like body that is obtained by integrally molding hard rubber approximately into a U-shape so as to be along the shape of the outer circumference side of the tire (approximately U-shaped cross-section). The second U-shaped portion 122 has an inside part 122a (second inside sheet-like part), a crossing part 122b (second ground-contactable sheet-like part), and an outside part 122c (second outside sheet-like part).

The inside part 122a elongates along the inside sidewall part of the tire T in the radial direction and circumferential direction thereof. The crossing part 122b merges into the inside part 122a so as to be gently curved outward with about 90 degrees from the inside part 122a; crosses the tread part of the tire T; and elongates along the outer circumferential surface of the tire T in the circumferential direction. The outside part 122c is gently curved with about 90 degrees from the crossing part 122b, and elongates along the outside sidewall part in the radial direction and circumferential direction thereof. The crossing part 122b has a larger thickness than those of other parts because the outermost surface of the crossing part 122b is to be a ground-contactable surface when it is attached to the tire T. In addition, a plurality of elongate anti-skid grooves 122g are formed at the side of the outermost surface of the crossing part 122b to extend in the axial direction of the wheel.

The inside front extending portion 121 merges into the end part in the radial direction of the inside part 122a of the second U-shaped portion 122 so as to be gently curved to the frontward circumferential direction with about 90 degrees, and extends along the inside sidewall part. The outside rear extending portion 123 merges into the end part in the radial direction of the outside part 122c of the second U-shaped portion 122 so as to be gently curved to the rearward circumferential direction with about 90 degrees, and extends along the outside sidewall part.

The front end part of the inside front extending portion 121 is formed with an inside front connecting part 1211 that is provided with an elongated and reinforced hole along the radial direction of the tire. The rear end part of the outside rear extending portion 123 is also formed with an outside rear connecting part 1232 that is provided with an elongated and reinforced hole along the radial direction of the tire.

Thus, the first main body 11 and the second main body 12 are not the same members because the direction of each extending portion and the arrangement of each connecting part are inverted, but other portions or parts are basically in the same form. Hereinafter, as for contents common in the first main body and the second main body, those of the first main body will be mainly described, and description for the second main body may be omitted.

Inside Belt-Like Connecting Body

The inside belt-like connecting body 13 comprises a first inside belt 131, a second inside belt 132, and an inside length adjuster 133 (so-called strap adjuster).

The first inside belt 131 has an inside front end part 1311, which is inserted into and attached to the inside rear connecting part 1112 of the first main body 11 by the end of the inside front end part 1311 being sewn with the first inside belt 131 after inserted into the inside rear connecting part 1112. The second inside belt 132 has an inside rear end part 1322, which is inserted into and attached to the inside front connecting part 1211 of the second main body 12 by the end of the inside rear end part 1322 being sewn with the second inside belt 132 after inserted into the inside front connecting part 1211.

The inside length adjuster 133 is provided between an inside rear end part 1312 of the first inside belt 131 and an inside front end part 1321 of the second inside belt 132 to connect the inside rear end part 1312 and the inside front end part 1321 with each other while adjusting the distance (connecting length) between the inside rear connecting part 1112 and the inside front connecting part 1211. Specifically, the inside length adjuster 133 is formed in a ladder ring-like shape such that a front column 1331, a rear column 1332 and a center column 1333 are connected by an outer frame. The front column 1331 and the center column 1333 form a front ring therebetween, while the rear column 1332 and the center column 1333 form a rear ring therebetween.

The inside rear end part 1312 of the first inside belt 131 is folded at the center column 1333 to be interposed between the front column 1331 and the first inside belt 131, and thereby inserted into and attached to the front side of the inside length adjuster 133. The inside front end part 1321 of the second inside belt 132 is inserted into and attached to the inside length adjuster 133 (rear column 1332) by the end of the inside front end part 1321 being sewn with the second inside belt 132 after inserted into the rear ring of the inside length adjuster 133.

Here, the inside rear end part 1312 is not fixedly combined with the first inside belt 131. Therefore, the position to be inserted and attached can freely be varied thereby to allow the adjustment of the connecting length between the first inside belt 131 and the second inside belt 132 (distance between the inside rear connecting part 1112 and the inside front connecting part 1211) over a wide range in a stepless manner. Note that each inside belt according to the present embodiment may be formed of chemical fiber (e.g., polypropylene fiber) or the like which is excellent in the strength, durability, weatherability and other necessary properties (the same applied to each outer belt to be described later).

Outside Belt-Like Connecting Body and Connectable/Disconnectable Connector

The outside belt-like connecting body 14 comprises a first outside belt 141, a second outside belt 142, and the connectable/disconnectable connector 15. The connectable/disconnectable connector 15 is a so-called one-touch buckle, which comprises a male plug 151 and a female receptor 152.

The first outside belt 141 has an outside rear end part 1412, which is inserted into and attached to the outside front connecting part 1131 of the first main body 11 by the end of the outside rear end part 1412 being sewn with the first outside belt 141 after inserted into the outside front connecting part 1131. The first outside belt 141 further has an outside front end part 1411 of which the end is inserted into and attached to a male-side connecting part 1511 of the male plug 151. The male-side connecting part 1511 acts also as an outside length adjuster formed in a ladder ring-like shape as with the inside length adjuster 133. Accordingly, by using the male-side connecting part 1511, the connecting length between the male plug 151 and the outside front connecting part 1131 of the first main body 11 (distance between the outside front connecting part 1131 and an outside rear connecting part 2232) can be adjusted over a wide range in a stepless manner.

The second outside belt 142 (242) has an outside front end part 1421, which is inserted into and attached to an outside rear connecting part 1232 of the second main body 12 by the end of the outside front end part 1421 being sewn with the second outside belt 142 after inserted into the outside rear connecting part 1232. The second outside belt 142 (242) further has an outside rear end part 1422 (2422), which is inserted into and attached to a ring-like female-side connecting part 1522 (2522) of the female receptor 152 (252) by the end of the outside rear end part 1422 (2422) being sewn with the second outside belt 142 (242) after inserted into the female-side connecting part 1522 (2522).

Figure 3:
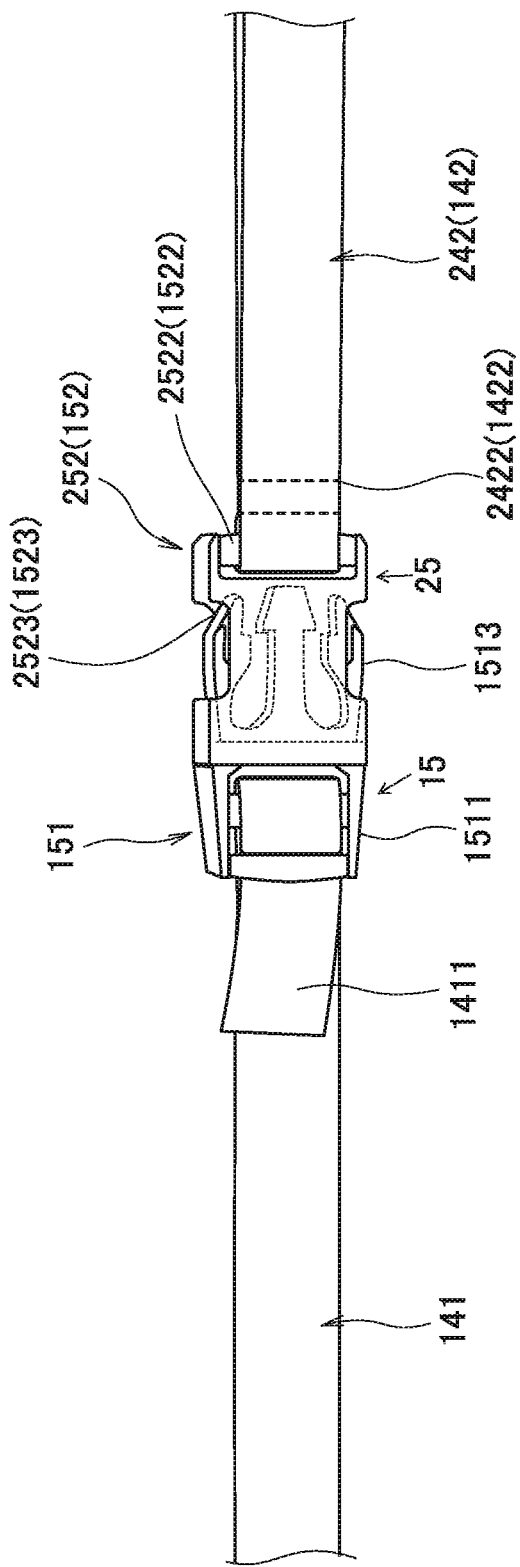
FIG. 3 is a perspective view illustrating an example of a connectable/disconnectable connector.

As shown in FIG. 3, the connectable/disconnectable connector 15 comprises the fork-like male plug 151 having three projections and the rectangular female receptor 152 (252) for receiving the three projections of the male plug 151. When both of outside projections 1513 of the male plug 151 elastically extend outward to engage into notches 1523 (2523) that are provided on both side surfaces at the center of the female receptor 152 (252), and the male plug 151 and the female receptor 152 (252) are thereby combined with each other. In contrast, when the outside projections 1513 are elastically contracted inward, the combination of the male plug 151 and the female receptor 152 (252) can be released.

Second Example

Figure 4:
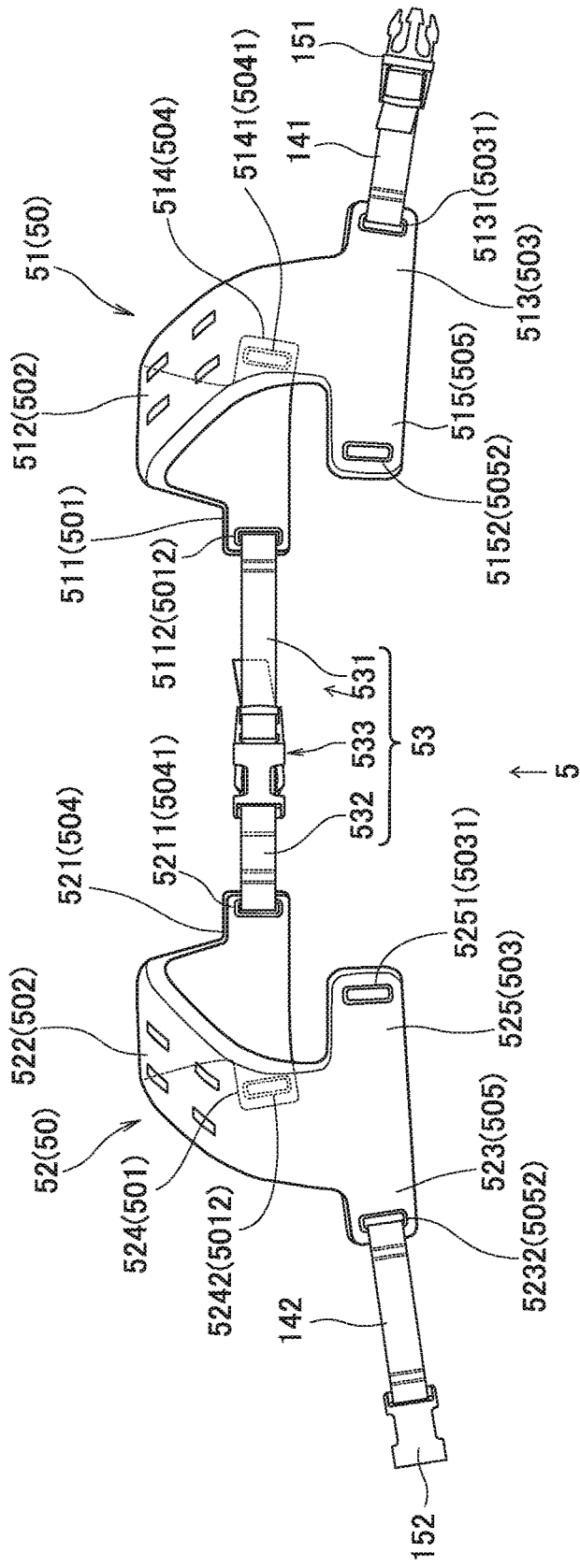
FIG. 4 is a perspective view illustrating an elementary unit according to a second example.

FIG. 4 illustrates an elementary unit 5 in which the first main body 11, the second main body 12 and the inside belt-like connecting body 13 of the elementary unit 1 are respectively substituted with a first main body 51, a second main body 52 and an inside belt-like connecting body 53. Similar members to those of the elementary unit 1 are denoted by the same reference numeral, and detailed descriptions thereof will be omitted. Other parts not described in detail are also similar to those in the case of the first example. The same applies to the other examples as will be described later.

Each of the first main body 51 and the second main body 52 of the elementary unit 5 comprises a unified main body 50 that has a shared form. Therefore, according to the elementary unit 5, preparation of two kinds of main bodies is unnecessary, so that one kind of main body can be shared to be utilized. This allows the reduction in production cost and management cost compared to the case of the elementary unit 1 (2, 3) because the number of components can be reduced.

Specifically, the unified main body 50 has: a U-shaped portion 502; and four extending portions 501, 503, 504 and 505 that extend toward both directions in the circumferential direction at the vicinities of the inner circumferential ends of the U-shaped portion 502. Each extending portion is formed with a corresponding one of connecting parts 5012, 5031, 5041 and 5052. The unified main body 50 is also formed as a wide sheet-like body that is obtained by integrally molding hard rubber approximately into a U-shape so as to be along the shape of the outer circumference side of the tire (approximately U-shaped cross-section). However, different from the main bodies 11 and 12, the unified main body 50 has a shape that is symmetrical with respect to the center line which cross the center of the U-shaped portion 502 in the wheel axis direction and also symmetrical with respect to the center line which cross the center of the U-shaped portion 502 in the outer circumferential direction of the tire T (direction perpendicular to the wheel axis direction) (i.e., symmetrical with respect to the rear-front direction and the outside-inside direction).

When the unified main body 50 is used as a first main body 51, like in the case of the first main body 11, the extending portion 501 is an inside rear extending portion 511, the U-shaped portion 502 is a first U-shaped portion 512, the extending portion 503 is an outside front extending portion 513, the connecting part 5012 is an inside rear connecting part 5112, and the connecting part 5031 is an outside front connecting part 5131. In this case, however, the extending portion 504 as an inside front extending portion 514 and the connecting part 5041 as an inside front connecting part 5141, and the extending portion 505 as an outside rear extending portion 515 and the connecting part 5052 as an outside rear connecting part 5152, act as holding parts (abutting parts) that further improve the holding ability of the first main body 51 to the tire.

When the unified main body 50 is used as a second main body 52, like in the case of the second main body 12, the extending portion 504 is an inside front extending portion 521, the U-shaped portion 502 is a second U-shaped portion 522, the extending portion 505 is an outside rear extending portion 523, the connecting part 5041 is an inside front connecting part 5211, and the connecting part 5052 is an outside rear connecting part 5232. In this case, however, the extending portion 501 as an inside rear extending portion 524 and the connecting part 5012 as an inside rear connecting part 5242, and the extending portion 503 as an outside front extending portion 525 and the connecting part 5031 as an outside rear connecting part 5251, act as holding parts that further improve the holding ability of the second main body 52 to the tire.

In the case of the elementary unit 5, the first main body 51 and the second main body 52 can be connected using the inside belt-like connecting body 13 as with the case of the elementary unit 1, but the present example is described as using an inside belt-like connecting body 53. The inside belt-like connecting body 53 comprises a first inside belt 531, a second inside belt 532, and an inside length adjuster 533. The first inside belt 531 and the second inside belt 532 are substantially the same as the first inside belt 131 and the second inside belt 132, respectively. The inside length adjuster 533 is obtained by substituting the inside length adjuster 133 (strap adjuster) with a one-touch buckle like the connectable/disconnectable connector 15.

Third Example

Figure 5:
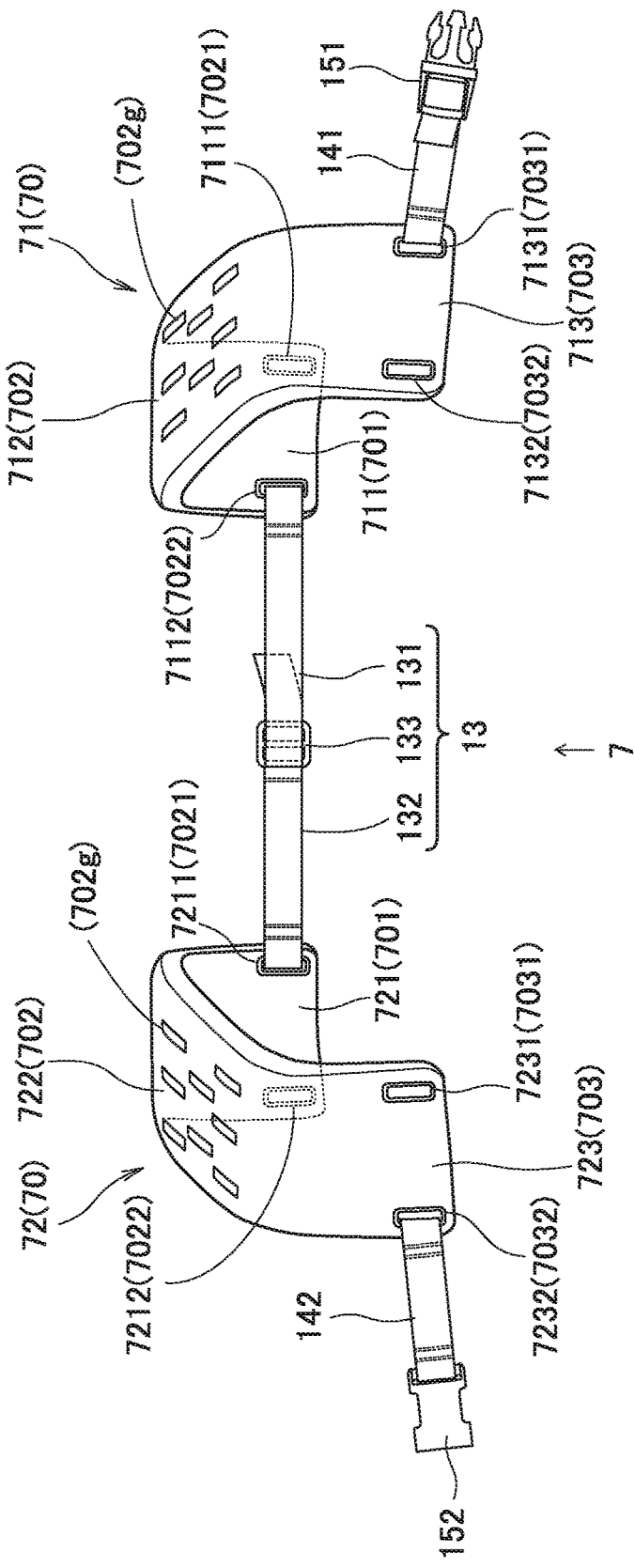
FIG. 5 is a perspective view illustrating an elementary unit according to a third example.

FIG. 5 illustrates an elementary unit 7 in which the first main body 11 and the second main body 12 of the elementary unit 1 are respectively substituted with a first main body 71 and a second main body 72.

Each of the first main body 71 and the second main body 72 of the elementary unit 7 comprises a unified main body 70. This unified main body 70 has a more simple shape than that of the previously-described unified main body 50. Using the elementary unit 7 comprising such unified main bodies 70 allows a further reduction in production cost and management cost compared not only to the case of using the elementary unit 1 (2, 3) but also to the case of using the elementary unit 5

Specifically, the unified main body 70 comprises: an inside part 701 that also acts as the inside extending portions (inside front extending portion and inside rear extending portion); a crossing part 702 to be the ground-contactable sheet-like part; and an outside part 703 that also acts as the outside extending portions (outside front extending portion and outside rear extending portion). The inside part 701 extends along the inside sidewall part of the tire T in the radial direction and circumferential direction thereof. The crossing part 702 merges into the inside part 701 so as to be gently curved outward with about 90 degrees from the inside part 701; crosses the tread part of the tire T; and extends along the outer circumferential surface of the tire T in the circumferential direction. The outside part 703 is gently curved with about 90 degrees from the crossing part 702, and extends along the outside sidewall part in the radial direction and circumferential direction thereof. The unified main body 70 is also formed as a wide sheet-like body that is obtained by integrally molding hard rubber approximately into a U-shape so as to be along the shape of the outer circumference side of the tire (approximately U-shaped cross-section). The unified main body 70 also has a shape that is symmetrical with respect to the rear-front direction and the inside-outside direction.

The inside part 701 has a connecting part 7021 at the front side and a connecting part 7022 at the rear side, both in the vicinities of the inner circumferential ends. The outside part 703 has a connecting part 7031 at the front side and a connecting part 7032 at the rear side, both in the vicinities of the inner circumferential ends. The crossing part 702 has a larger thickness than those of other parts because the outermost surface of the crossing part 702 is to be a ground-contactable surface when it is attached to the tire. In addition, a plurality of elongate anti-skid grooves 702g are formed at the side of the outermost surface of the crossing part 702 to extend in the axial direction of the wheel.

When the unified main body 70 is used as a first main body 71, the inside part 701 is an inside part 711, the outside part 703 is an outside part 713, the connecting part 7022 is an inside rear connecting part 7112, and the connecting part 7031 is an outside front connecting part 7131. Also in this case, as with the unified main body 50, the connecting part 7021 as an inside front connecting part 7111 and the vicinity thereof, and the connecting part 7032 as an outside rear connecting part 7132 and the vicinity thereof, act as holding parts that improve the holding ability of the first main body 71 to the tire.

When the unified main body 70 is used as a second main body 72, the inside part 701 is an inside part 721, the outside part 703 is an outside part 723, the connecting part 7021 is an inside front connecting part 7211, and the connecting part 7032 is an outside rear connecting part 7232. Also in this case, as with the unified main body 50, the connecting part 7022 as an inside rear connecting part 7212 and the vicinity thereof, and the connecting part 7031 as an outside front connecting part 7231 and the vicinity thereof, act as holding parts that improve the holding ability of the second main body 72 to the tire.

Other Examples

Figure 6:
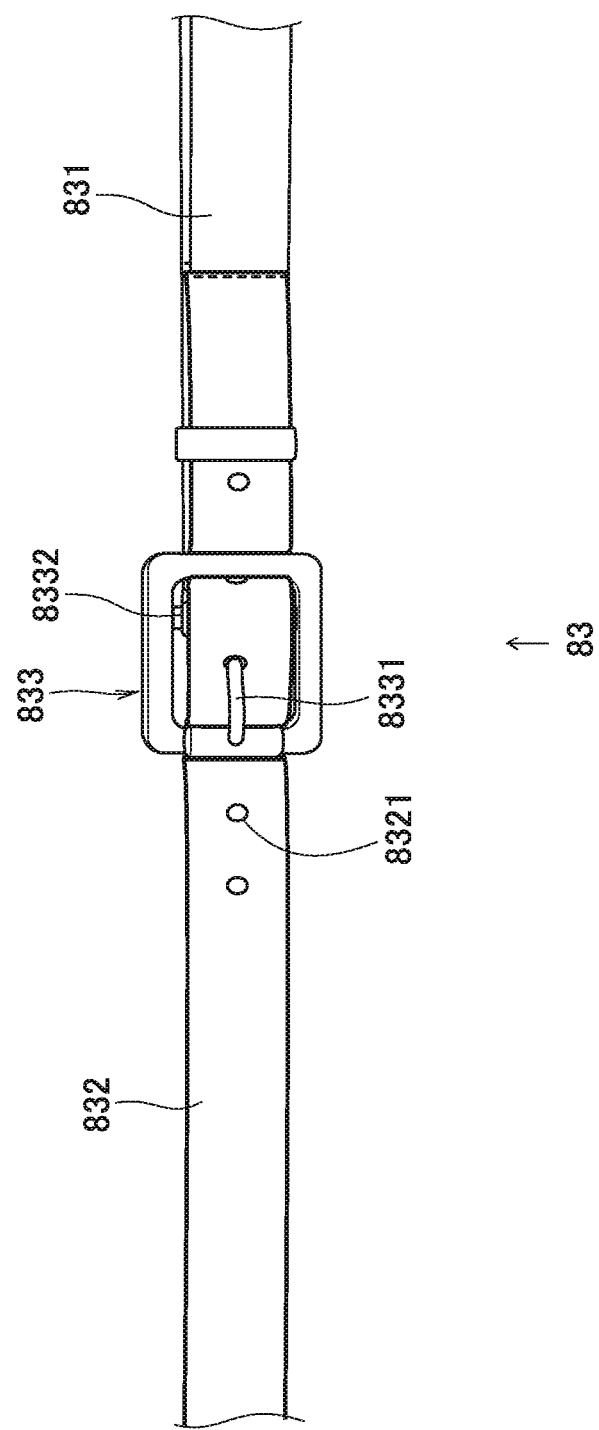
FIG. 6 is a perspective view illustrating another example of a belt-like connecting body.

At least one of the above-described inside belt-like connecting body (including the inside length adjuster) and outside belt-like connecting body (including the connectable/disconnectable connector) may be substituted with a belt-like connecting body 83 as illustrated in FIG. 6. The belt-like connecting body 83 comprises a first belt 831, a second belt 832, and a connecting adjuster 833 that is provided as a belt buckle. One end part of the first belt 831 is attached to a center column 8332, which is fixed to a frame of the connecting adjuster 833, so that the center column 8332 is inserted in the end part of the first belt 831. One end part of the second belt 832 is provided with a plurality of engaging holes 8321 at a predetermined pitch. An engaging hook 8331 pivotally supported by the center column 8332 of the connecting adjuster 833 is inserted into one of the engaging holes 8321. The first belt 831 and the second belt 832 are thus connected with each other while the connecting length is adjusted in a stepwise manner by changing the position of an engaging hole 8321 into which the engaging hook 8331 is inserted.

Figure 7:
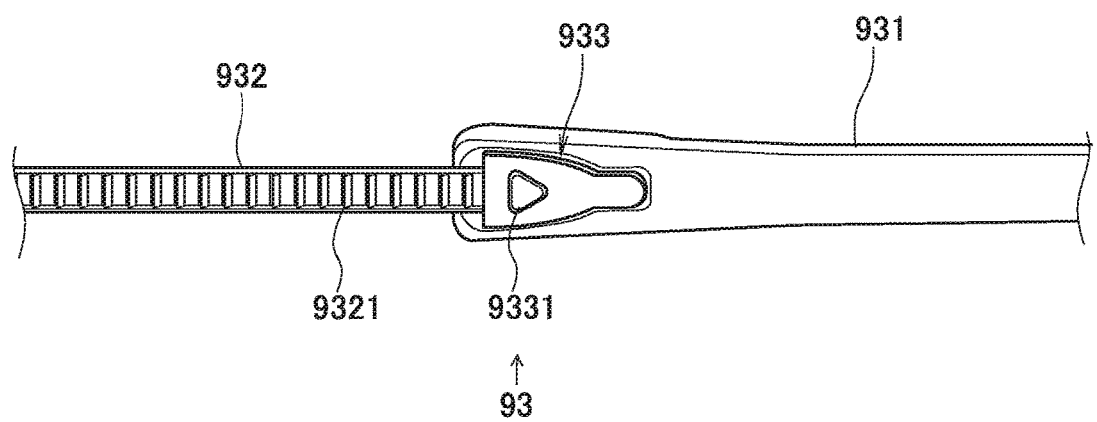
FIG. 7 is a perspective view illustrating still another example of a belt-like connecting body.

At least one of the inside belt-like connecting body (including the inside length adjuster) and the outside belt-like connecting body (including the connectable/disconnectable connector) may be substituted with a belt-like connecting body 93 as illustrated in FIG. 7. The belt-like connecting body 93 comprises a first belt 931, a second belt 932, and a connecting adjuster 933 that is a ratchet buckle. The connecting adjuster 933 is provided as a lever-like connecting adjuster, which is pivotally supported at one end part of the first belt 931. One end part of the second belt 932 is provided with a plurality of teeth 9321 having a predetermined pitch. When a tab 9331 (which projects toward the back of the sheet of FIG. 7) of the connecting adjuster 933 is engaged with the teeth 9321 so as to be positioned, the first belt 931 and the second belt 932 are connected with each other while the connecting length is adjusted in a stepwise manner.

Figure 8:
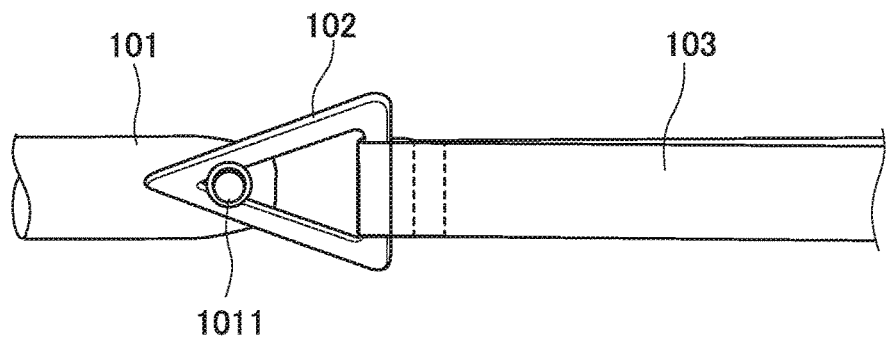
FIG. 8 is a perspective view illustrating another example of a connecting part.

The above examples are described as cases in which each connecting part is integrally formed with the sheet-like (or belt-like) main body. In an alternative example, as shown in FIG. 8, for example, the connecting part may be configured as a connecting ring 102 or the like of which one end part is fixed to an extending portion 101 of the main body via a rivet 1011. This allows easy connection using a belt-like connecting body 103 even in a case where the main body (in particular each extending portion) is not in a sheet-like form or the like (e.g., a rod-like main body of resin or rubber). Each belt may be a chemical fiber belt having good flexibility as previously described, or may also be a soft rubber belt having good stretchability or a hard rubber belt of the same material as that of the main body, etc. If the adjustment of the connecting length is not necessary, the anti-skid device according to the present invention may be configured such that the main body and each connecting body are integrated at each connecting part.

As illustrated in FIG. 9, the outer surface side of the crossing part 112b of the first main body 11' used in the elementary unit 1 may be formed with rhombus-shaped blocks 112k (anti-skid patters), which are integrally molded with the crossing part 112b, and metallic stud pins (anti-skid pieces). This allows the crossing part 112b to have a drastically improved anti-skid ability when it is integrally molded of hard rubber. This applies to the outer surface of the crossing part 122b of the second main body 12. Similar anti-skid patters and/or anti-skid pieces may also be provided on the crossing part (ground-contactable sheet-like part) of the unified main body 50 or the unified main body 70.

The unified main body 50 used in the elementary unit 5 may be substituted with a unified main body 55 as illustrated in FIG. 10. As with the unified main body 50, the unified main body 55 has: a U-shaped portion 552; and four extending portions 551, 553, 554 and 555 that extend toward both directions in the circumferential direction in the vicinities of the inner circumferential ends of the U-shaped portion 552. Each extending portion is formed with a corresponding one of connecting parts 5512, 5531, 5541 and 5552. However, different from the unified main body 50, the unified main body 55 is configured such that extending portions adjacent to each other in the circumferential direction extend in a branch form. By changing the extending directions of the extending portions in such a fashion, the main bodies that constitute the elementary unit can be more stably maintained with one another.

Figure 2:
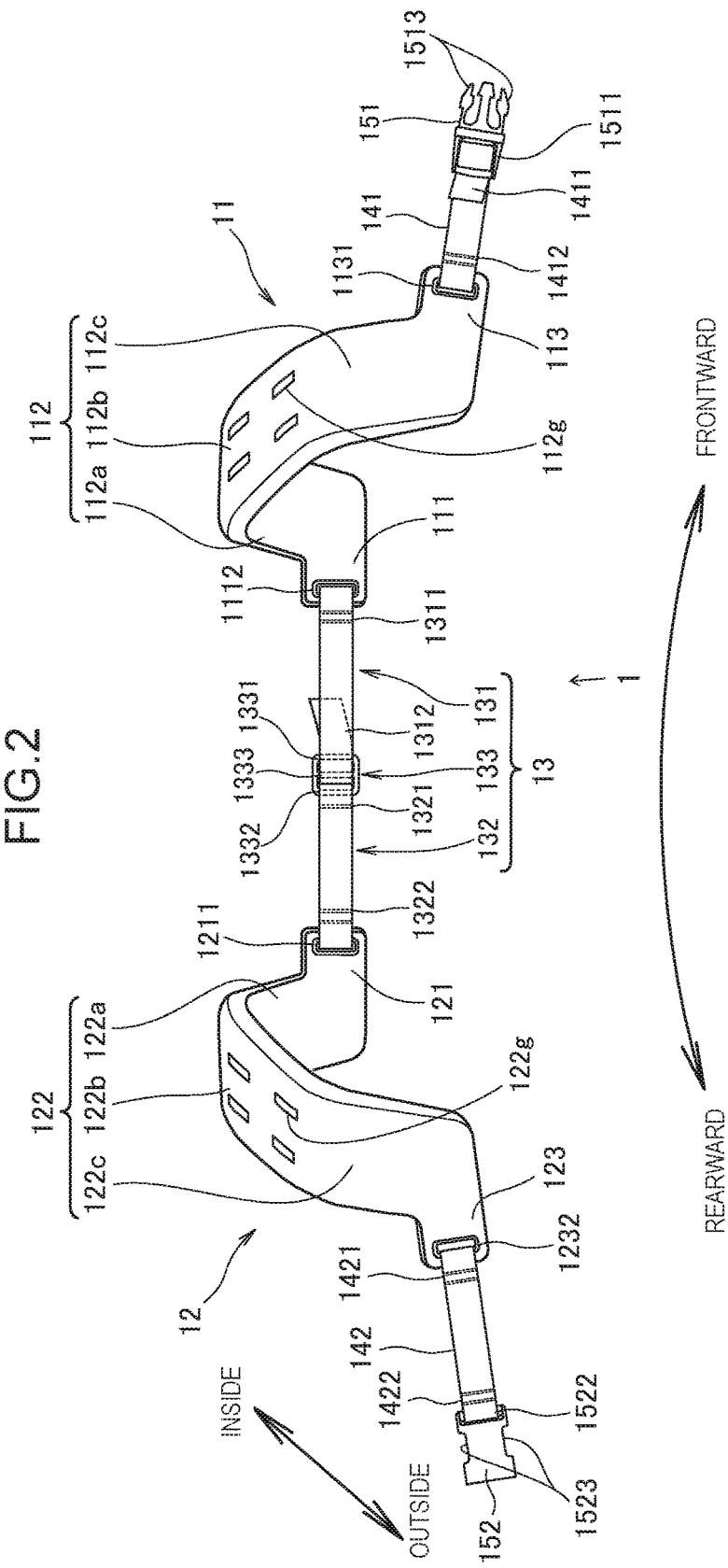
FIG. 2 is a perspective view illustrating an elementary unit according to the first example.
Figure 11:
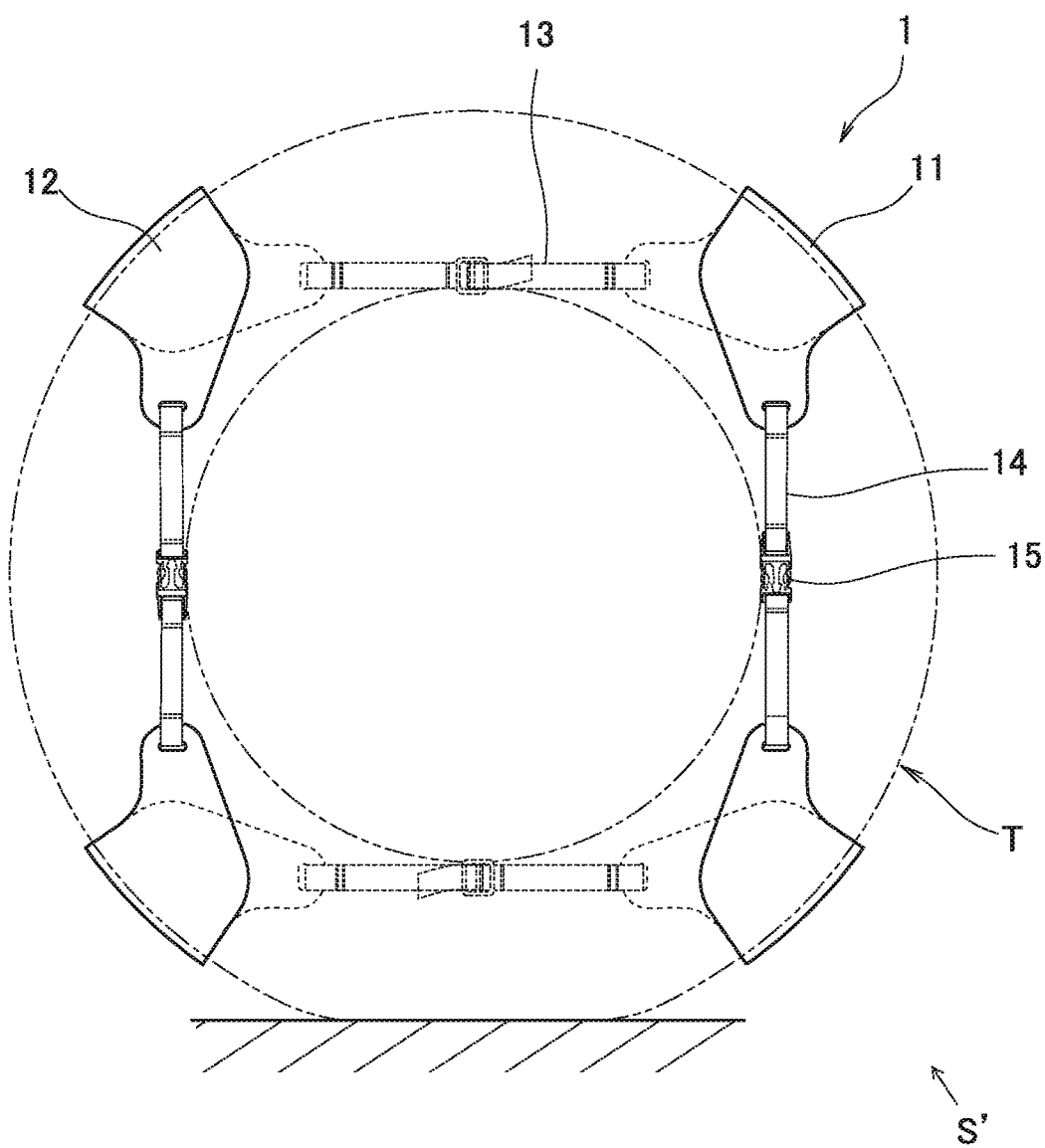
FIG. 11 is a front elevational view illustrating another example of an anti-skid device for tires in which elementary units are arranged in a modified manner.

FIG. 11 illustrates an appearance that an anti-skid device S' comprising two sets of elementary units 1 is attached to a tire T. By adjusting each angle to form each of the inside rear extending portion 111, the outside front extending portion 113, the inside rear connecting part 1112 and the outside front connecting part 1131 of the first main body 11 such as illustrated in FIG. 2 and each of the inside front extending portion 121, the outside rear extending portion 123, the inside front connecting part 1211 and the outside rear connecting part 1232 of the second main body 12 or by adjusting each position to form each of them, the inside belt-like connecting bodies 13 and the outside belt-like connecting bodies 14 can be approximately in a shape of square when the anti-skid device S' is attached to the tire T, so that the first main bodies 11 and the second main bodies 12 can be disposed evenly in the vicinities of the corners. In this case, the anti-skid device S' can be more stably attached to the tire T.

Figure 12:
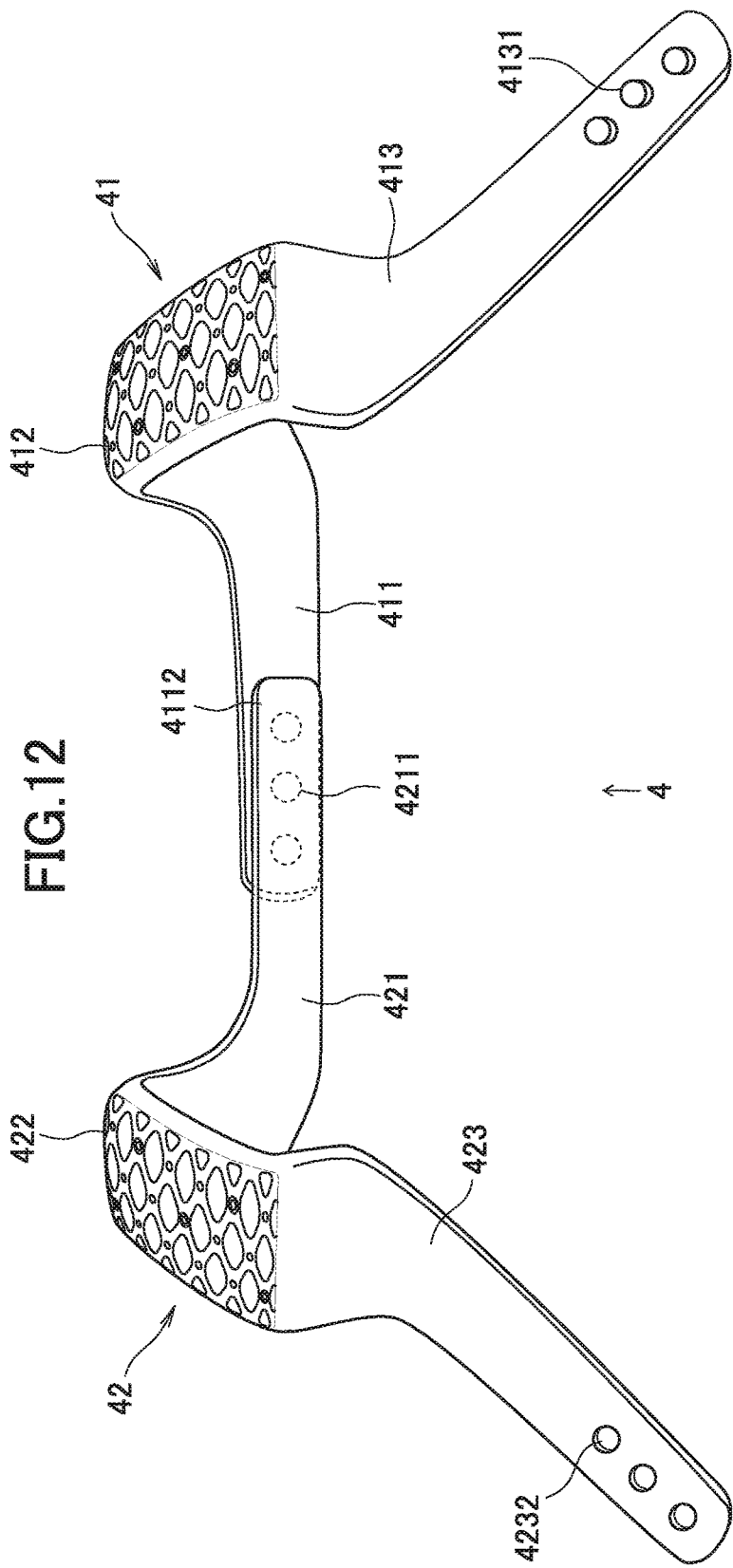
FIG. 12 is a perspective view illustrating an elementary unit comprising main bodies which are integrated with connecting bodies.

FIG. 12 illustrates an elementary unit 4 comprising main bodies in which the inside connecting body and the outside connecting body are integrated. The elementary unit 4 comprises a first main body 41 and a second main body 42. The first main body 41 has: a U-shaped portion 412 that constitutes the major part; an inside rear extending portion 411; and an outside front extending portion 413. The second main body 42 has: a U-shaped portion 422 that constitutes the major part; an inside front extending portion 421; and an outside rear extending portion 423. In this case, the inside rear extending portion 411 of the first main body 41 and the inside front extending portion 421 of the second main body 42 act also as the inside connecting body, and the outside front extending portion 413 of the first main body 41 and the outside rear extending portion 423 act also as the outside connecting body. Regarding similar parts to those in the case of the elementary unit 1, detailed descriptions are omitted.

A number of engaging holes 4112 (inside rear connecting parts) are arranged at the end part of the inside rear extending portion 411. The same number of engaging projections 4211 (inside front connecting parts) to be inserted into the engaging holes 4112 are arranged at the end part of the outside front extending portion 421 with the same pitch as that of the engaging holes 4112. The engaging projection or projections 4211 are inserted into the engaging hole or holes 4112 thereby to connect the first main body 41 and the second main body 42 at the inside. The engaging position between an engaging hole 4112 and an engaging projection 4211 may be changed, and the inside connecting length can thereby be easily change.

Likewise, a number of engaging holes 4232 (outside rear connecting parts) are arranged at the end part of the outside rear extending portion 423. The same number of engaging projections 4131 (outside front connecting parts) to be inserted into the engaging holes 4232 are arranged at the end part of the outside rear extending portion 413 with the same pitch as that of the engaging holes 4232. When attached to a tire, the first main body 41 and the second main body 42 adjacent to each other are connected at the outside by the engaging hole or holes 4232 and the engaging projection or projections 4131 being engaged with each other, so that the anti-skid device comprising the elementary units 4 is attached to the tire. Also in this case, the engaging position between an engaging projection 4131 and an engaging hole 4232 may be changed, and the outside connecting length can thereby be easily changed.

Figure 13:
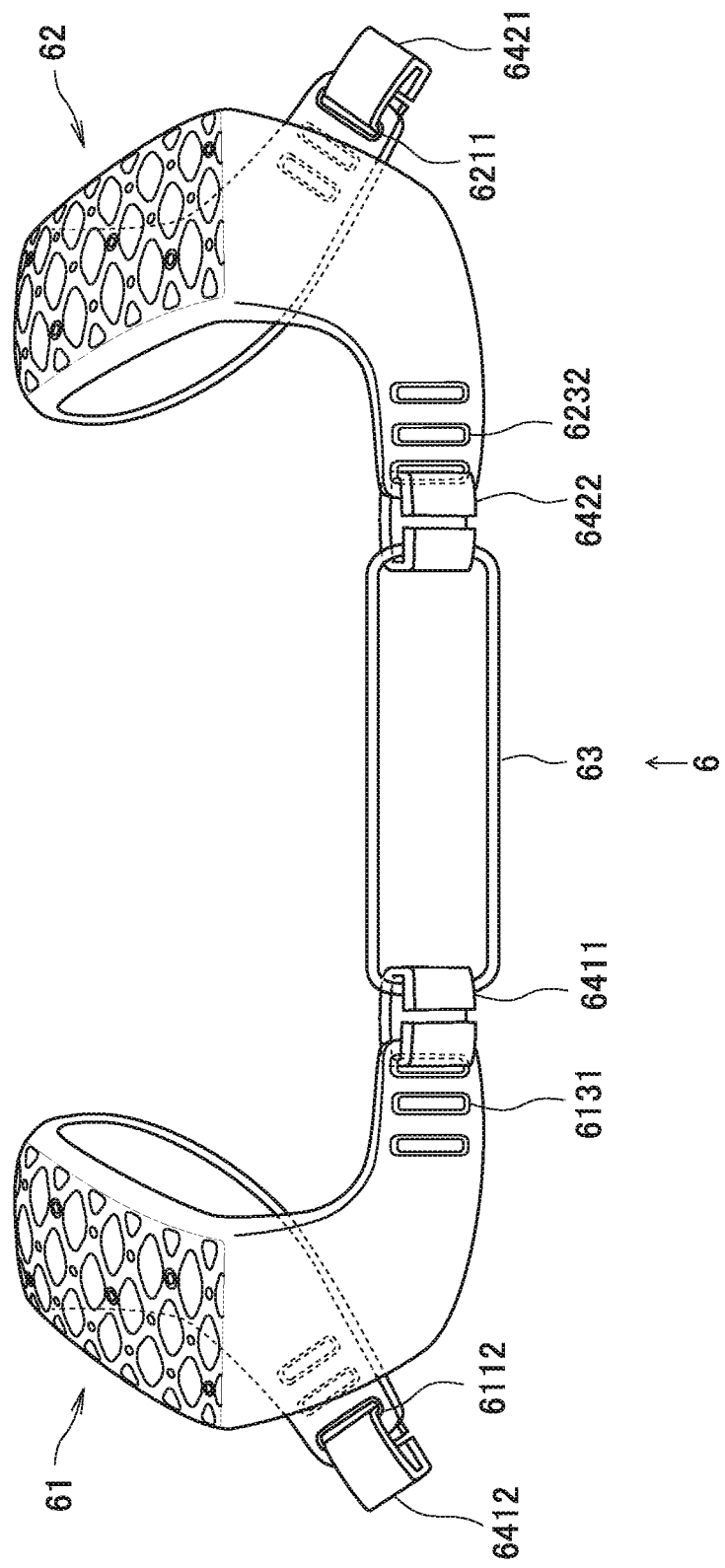
FIG. 13 is a perspective view illustrating an elementary unit using an elastic connecting body.

FIG. 13 illustrates an elementary unit 6 configured such that the belts (belt-like connecting body) of elementary unit 1 are substituted with a rubber ring (elastic connecting body). The elementary unit 6 comprises: a first main body 61; a second main body 62; an outside rubber ring 63 (outside elastic connecting body); an inside rubber ring (inside elastic connecting body, not shown); and engaging adapters 6411, 6412, 6421 and 6422 that comprise belt-like C-shaped rings to be engaged with those rubber rings. The first main body 61 and the second main body 62 have approximately the same shapes as those of the first main body 11 and the second main body 12, respectively, but an inside rear connecting part 6112 and an outside front connecting part 6131 of the first main body 61 and an inside front connecting part 6211 and an outside rear connecting part 6232 of the second main body 62 are each provided as a plurality of elongate holes (slits).

The engaging adapters 6412, 6411, 6421 and 6422 are respectively engaged with the connecting parts 6112, 6131, 6211 and 6232. A rubber ring (e.g., the outside rubber ring 63) may be engaged with or disengaged from between the engaging adapters adjacent to each other when attached to a tire, thereby to allow the elementary unit 6 to be easily attached to or detached from the tire. In order to ensure the engaging ability of the rubber ring and prevent a damage of the tire and the like, it is preferred to attach each engaging adapter to each connecting part so that the back side of the engaging adapter is located at the tire side. It should be noted that the connecting body according to the present invention can be considered as including such an engaging adapter or adapters.

For illustrative purposes, the elementary unit is described herein as a unit in which the main bodies are connected at the outside of the tire, but the main bodies are also connected at the inside of the tire when attached to the tire, as will be understood. The present invention is not limited to a case where the main bodies are connected using rubber rings at both sides (inside and outside) of the tire. The above-described belts may be used for connection at one side (in particular the inside) while a rubber ring may be used for connection at the other side (in particular the outside).

When such an elementary unit is used, simply by stretching and releasing the rubber ring, the anti-skid device can be quickly and easily attached to and detached from the tire. Moreover, by changing the position at which the engaging adapter is engaged with the connecting part, the inside connecting length and the outside connecting length can easily be adjusted. Therefore, as long as each main body (in particular the ground-contactable sheet-like part) matches the tire width (tread width), the anti-skid device can be attached to a variety of tires having different aspect ratios and rim diameters even when the anti-skid device is a device of one standard.

Figure 14:
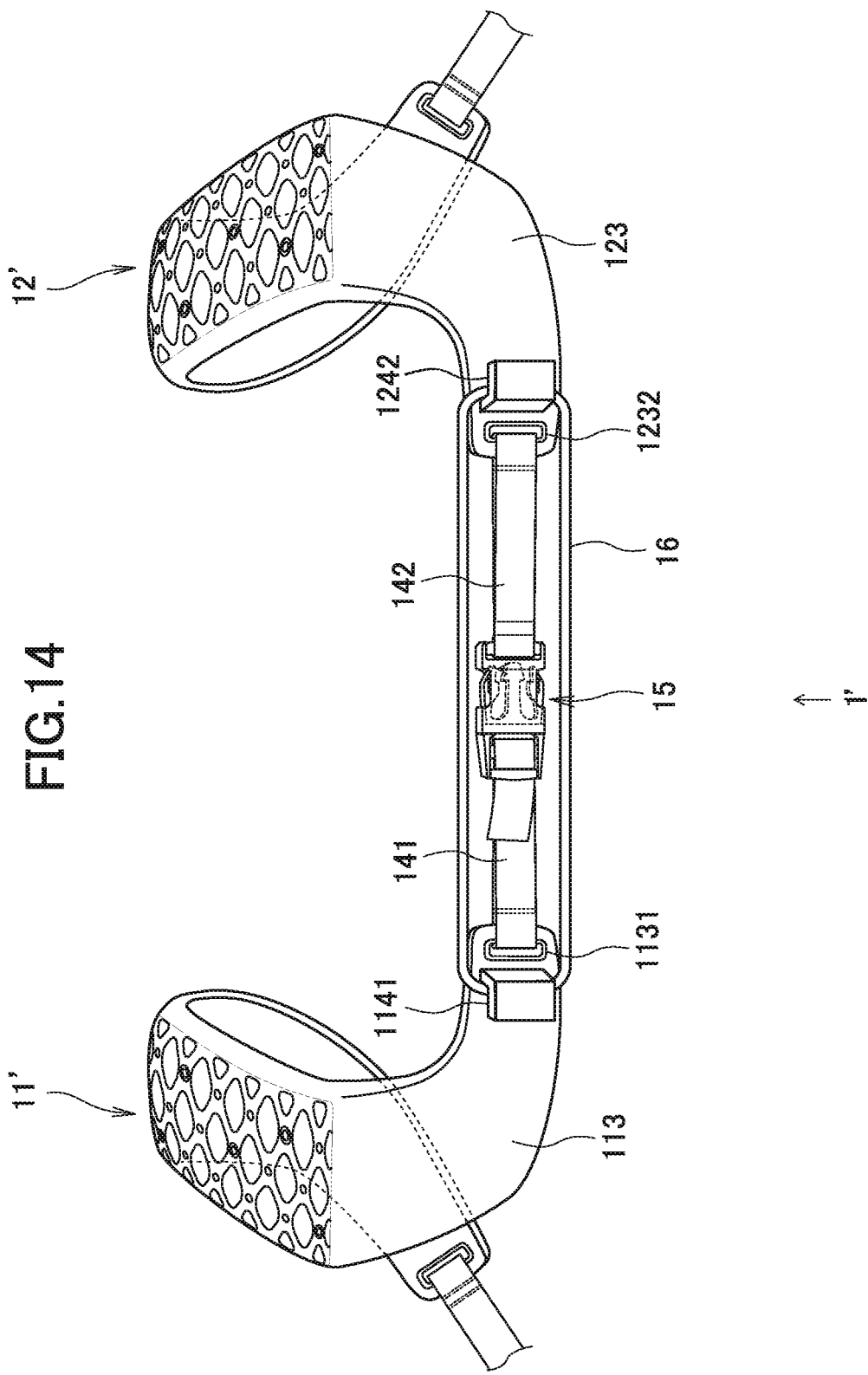
FIG. 14 is a perspective view illustrating an elementary unit in which a belt-like connecting body and an elastic connecting body are used in combination.

FIG. 14 illustrates an elementary unit 1' configured to enhance the connection at the outside between the first main body 11 and the second main body 12 that constitute the elementary unit 1. Regarding similar parts to those in the case of the elementary unit 1, detailed descriptions will be omitted.

The elementary unit 1' is configured such that the first main body 11 of the elementary unit 1 is substituted with a first main body 11' that has an engaging hook 1141 in the vicinity of the rear of the outside front connecting part 1131 and the second main body 12 is substituted with a second main body 12' that has an engaging hook 1242 in the vicinity of the front of the outside rear connecting part 1232. The elementary unit 1' is thereby allowed to engage an outside rubber ring 16 with the engaging hook 1141 and the engaging hook 1242 in addition to the connection by means of the first outside belt 141, the second outside belt 142 and the connectable/disconnectable connector 15. By stretching the outside rubber ring 16 to engage with the engaging hook 1141 and the engaging hook 1242, the elementary unit 1' (and therefore the anti-skid device) can be attached to the tire with more enhanced force. Each engaging hook may be integrally molded with the main body as a part thereof, or may otherwise be a hook-like metallic component that is independently fixed to the integrally molded main body.

Whether or not to engage the outside rubber ring 16 may be selected in accordance with the road surface condition. Such engagement of the rubber ring may be performed for each pair of adjacent engaging hooks, but one rubber ring may be engaged with all the engaging hooks at the outside (four engaging hooks if two sets of elementary units are used). If necessary, a bundle of rubber rings may be used.

Note that the above-described engaging hook can be considered as being the connecting part (or a part that constitutes it), and the rubber ring to be engaged with the hook can be considered as being the connecting body (or a part that constitutes it).

Figure 15A:
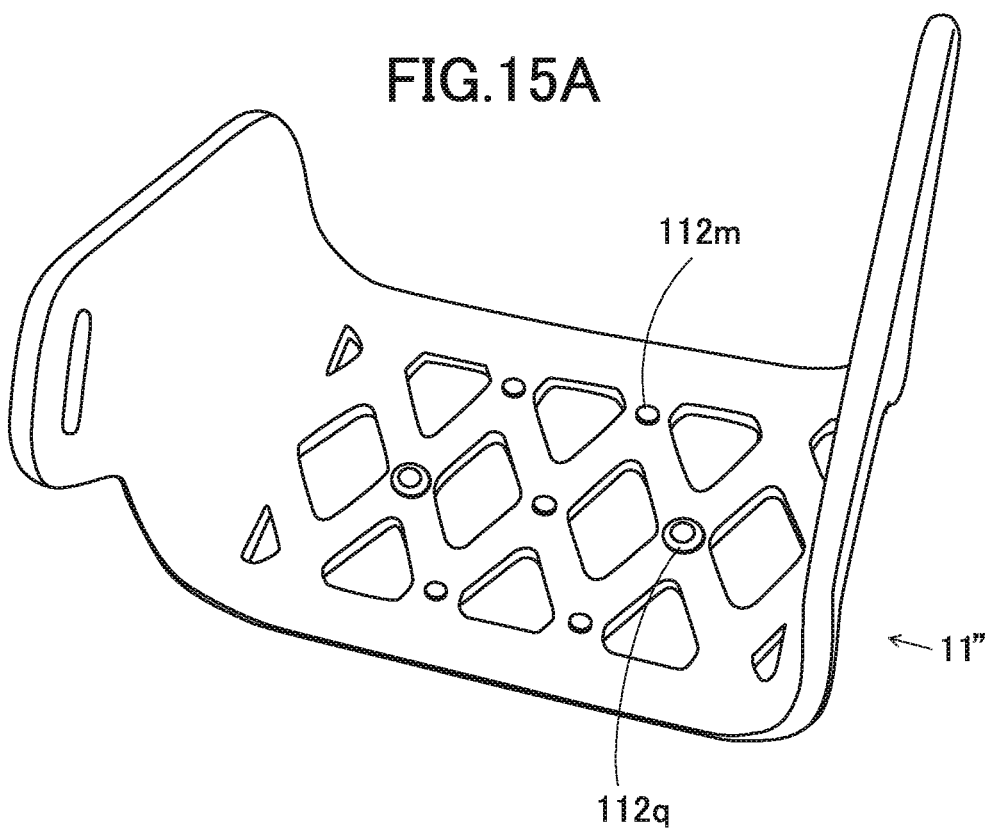
FIG. 15A is a perspective view illustrating an appearance that engaging protrusions and engaging pieces are provided on the inner surface of a ground-contactable sheet-like part.
Figure 15B:
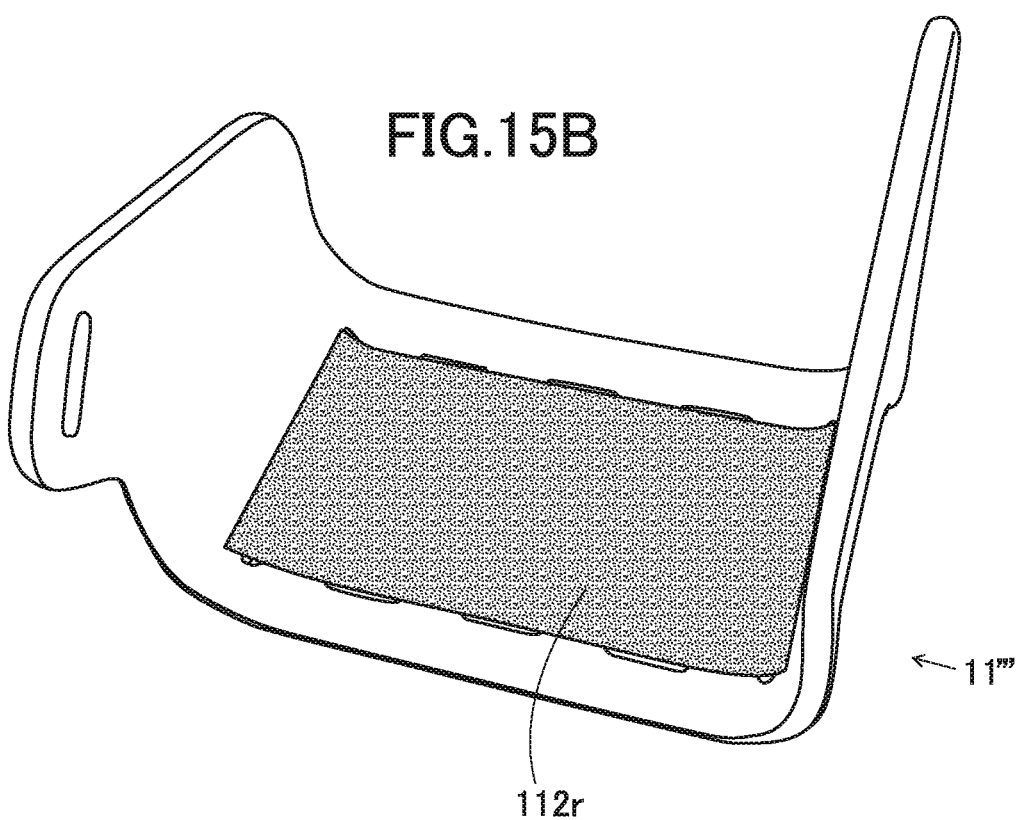
FIG. 15B is a perspective view illustrating an appearance that an anti-skid sheet is provided on the inner surface of a ground-contactable sheet-like part.

As illustrated in FIG. 15A, engaging protrusions 112*m* and metallic engaging pins 112*q* (engaging pieces) may be arranged at the inner circumferential surface side of the crossing part 112*b* of the first main body 11" used in the elementary unit 1. The engaging protrusions 112*m* are integrally molded with the crossing part 112*b*. The engaging protrusions 112*m* and the engaging pins 112*q* may be substituted with an anti-skid sheet 112*r* (engaging piece), as shown in FIG. 15B, which is applied to the inner circumferential surface side of the crossing part 112*b*. Such additional features allow the first main body 11''' to be more stably held by the outer circumferential surface of the tire T even when the vehicle is running. Similar engaging projections and/or engaging piece or pieces may also be provided at the inner circumferential surface side of the crossing part (ground-contactable sheet-like part) of the second main body 12, the unified main body 50 or the unified main body 70.

Figure 16:
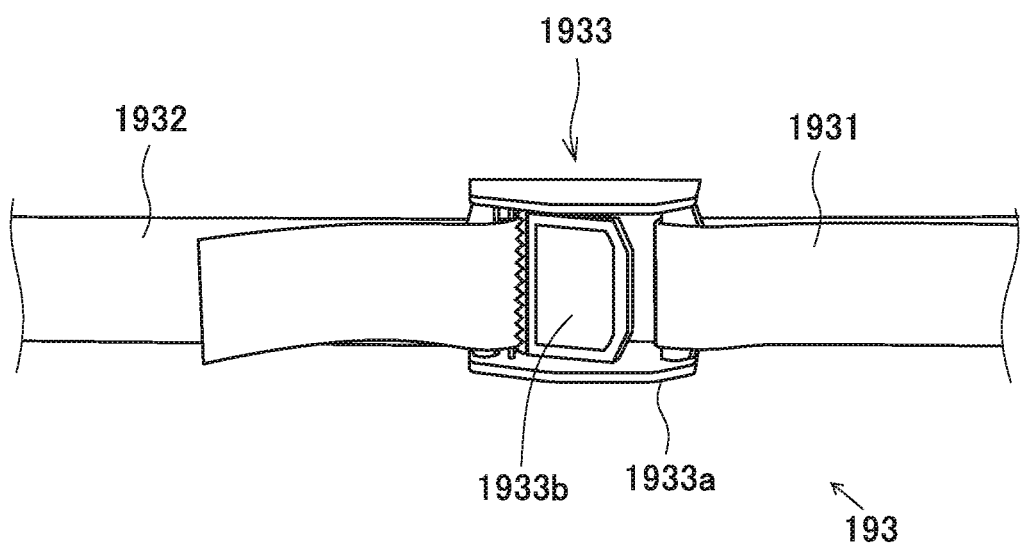
FIG. 16 is a perspective view illustrating a belt-like connecting body using a cam buckle.

At least one of the inside belt-like connecting body (including the inside length adjuster) and the outside belt-like connecting body (including the connectable/disconnectable connector) may be substituted with a belt-like connecting body 193 as illustrated in FIG. 16. The belt-like connecting body 193 comprises a first belt 1931, a second belt 1932, and a cam buckle 1933 (connecting adjuster). The cam buckle 1933 comprises: a housing 1933*a*; an engaging cam 1933*b* that is pivotally provided in the housing 1933*a* and biased in one direction (lock direction); and a spring (not shown) that biases the engaging cam 1933*b*. One end part of the first belt 1931 is connected with one end side of the housing 1933*a* by sewing. One end side of the second belt 1932 is inserted through the other end side of the housing 1933*a* to be interposed and engaged (locked) between the housing 1933*a* and the engaging cam 1933*b*. If the engaging cam 1993*b* is pivotally moved against the biasing force in the other direction, the one end side of the second belt 1932 is released, so that it is possible to adjust the connecting length of the first belt 1931 and the second belt 1932 and separate them (attaching/detaching). By utilizing such a cam buckle 1933, the first belt 1931 and the second belt 1932 can be easily and steadily fastened to each other while adjusting the connecting length thereof in a non-step manner.

Figure 17A:
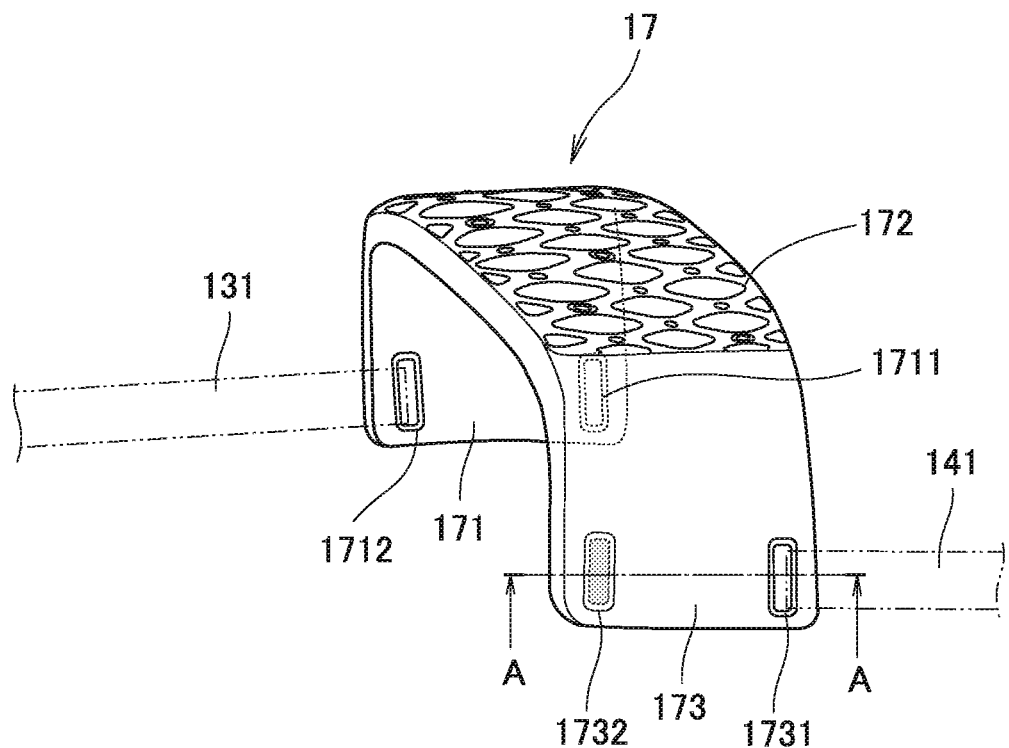
FIG. 17A is a perspective view illustrating a modified example of a unified main body used in the third example.
Figure 17B:
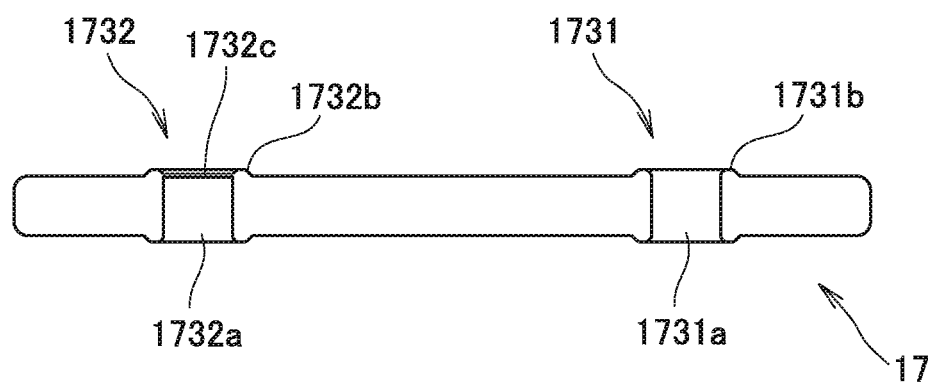
FIG. 17B is a partial cross-sectional view thereof.

FIG. 17A illustrates a unified main body 17 which is a modified example of the unified main body 70 as used in the third example. FIG. 17B illustrates A-A cross-section in FIG. 17A. As with the unified main body 70, the unified main body 17 has: a crossing part 172 that faces the tread part of a tire; and a first side part 171 and a second side part 173 that face the sidewall parts of the tire. In addition, connecting parts 1711 and 1712 are arranged at the front and rear of the first side part 171 at the inner circumferential side, and connecting parts 1731 and 1732 are arranged at the front and rear of the second side part 173 at the inner circumferential side. As with the unified main body 70, the unified main body 17 has a symmetrical shape; the first side part 171 and the second side part 173 are in the same form; and the four connecting parts 1711, 1712, 1731 and 1732 are all in the same form.

Each connecting part of the unified main body 17 is basically provided with an elongate hole into which a belt-like connecting body (e.g., inside belt-like connecting body 131, outside belt-like connecting body 141 or the like) can be inserted. At the stage where the unified main body 17 has been integrally molded using rubber or resin, etc., however, all of the connecting parts are closed by thin (or very thin) closing tabs located at the outer surface side so that the connecting body cannot be inserted therein. Here, for example, the closing tabs for the connecting parts 1712 and 1731 are removed (such as by drilling and punching), whereas the closing tabs for the connecting parts 1711 and 1732 remain. This allows the unified main body 17 to be the first main body as referred to in the present invention, as illustrated in FIG. 17A. For example, as illustrated in FIG. 17B, the connecting part 1732 not utilized in the first main body has the hole part 1732*a* and an annular rib 1732*b* that reinforces outer circumferences thereof, and the closing tab 1732*c* remains. Accordingly, an unnecessary connecting part (through-hole) is seemingly viewed as not being formed. On the other hand, the closing tab 1731*c* (not shown) of the connecting part 1731 is removed, and the connecting part 1731 comprises the hole part 1731*a* and an annular rib 1731*b* that reinforces outer circumferences thereof, so that the belt-like connecting body 141 or the like can be inserted into the hole part 1731*a*.

If the closing tabs for the connecting parts 1711 and 1732 are removed and the closing tabs for the connecting parts 1712 and 1731 remain, the unified main body 17 can be the second main body as referred to in the present invention. By leaving the closing tabs in such a manner, there is no unnecessary through-hole, and the design and aesthetic aspects of each main body and therefore of the anti-skid device can be improved. The closing tab for each connecting part may be preliminarily removed before the product is shipped, or may otherwise be removed by user after the shipment. The connecting part according to the present invention encompasses such a non-penetrating state.

The preceding description has been presented only to illustrate and describe exemplary embodiments of the present anti-skid device for a tire and the main body for the anti-skid device. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

The contents of Japanese Patent Application Nos. 2014-002162 filed on Jan. 9, 2014 and 2014-101734 filed on May 15, 2014, including specifications, claims and drawings, are incorporated herein by reference in their entirety.

What is claimed is:

1. An anti-skid device for a tire comprising:
a first main body; and
a second main body disposed rearward of the first main body, the first main body and the second main body are made of an elastic material;
wherein the first main body comprises: a first ground-contactable sheet-like part that elongates in a circumferential direction; a first inside rear connecting part that merges into the first ground-contactable sheet-like part at a rear side of the first ground-contactable sheet-like part and an inside of the first ground-contactable sheet-like part; and a first outside front connecting part that merges into the first ground-contactable sheet-like part at an outside of the first ground-contactable sheet-like part and a front side of the first ground-contactable sheet-like part,
wherein the second main body comprises: a second ground-contactable sheet-like part that elongates in the circumferential direction; a second inside front connecting part that merges into the second ground-contactable sheet-like part and is arranged at an inside of the second ground-contactable sheet-like part and a front side of the second ground-contactable sheet-like part; and a second outside rear connecting part that merges into the second ground-contactable sheet-like part at an outside of the second ground-contactable sheet-like part and a rear side of the second ground-contactable sheet-like part,
wherein a cross-section of the first main body is approximately U-shaped, the first main body comprises: a first inside sheet-like part that merges into an inside shoulder part of the first ground-contactable sheet-like part and elongates in the circumferential direction; and a first outside sheet-like part that merges into an outside shoulder part of the first ground-contactable sheet-like part and elongates in the circumferential direction, wherein the first ground-contactable sheet-like part has a larger thickness than the first inside sheet-like part,
wherein a cross-section of the second main body is approximately U-shaped, the second main body comprises: a second inside sheet-like part that merges into an inside shoulder part of the second ground-contactable sheet-like part and elongates in the circumferential direction; and a second outside sheet-like part that merges into an outside shoulder part of the second ground-contactable sheet-like part and elongates in the circumferential direction,
wherein the first main body comprises a first outside rear connecting part that merges into the first ground-contactable sheet-like part at a rear side of the first ground-contactable sheet-like part and an outside of the first ground-contactable sheet-like part; and a first inside front connecting part that merges into the first ground-contactable sheet-like part at an inside of the first ground-contactable sheet-like part and a front side of the first ground-contactable sheet-like part; and
the second main body comprises a second outside front connecting part that merges into the second ground-contactable sheet-like part and is arranged at an outside of the second ground-contactable sheet-like part and a front side of the second ground-contactable sheet-like part; and a second inside rear connecting part that merges into the second ground-contactable sheet-like part at an inside of the second ground-contactable sheet-like part and a rear side of the second ground-contactable sheet-like part.

2. The anti-skid device for tires as recited in claim 1,
wherein the inside rear connecting part is provided at a rear part of the first inside sheet-like part,
wherein the outside front connecting part is provided at a front part of the first outside sheet-like part,
wherein the inside front connecting part is provided at a front part of the second inside sheet-like part,
wherein the outside rear connecting part is provided at a rear part of the second outside sheet-like part.

3. The anti-skid device for tires as recited in claim 1,
wherein the first main body comprises: an outside front extending portion that extends frontward with respect to the first ground-contactable sheet-like part,
wherein the second main body comprises: an outside rear extending portion that extends rearward with respect to the second ground-contactable sheet-like part,
wherein the outside front connecting part is provided at the outside front extending portion,
wherein the outside rear connecting part is provided at the outside rear extending portion,
at least one of the outside front extending portion and the outside rear extending portion forms a sheet-like body.

4. The anti-skid device for tires as recited in claim 1, further comprising an inside connecting body that connects the inside rear connecting part and the inside front connecting part.

5. The anti-skid device for tires as recited in claim 4,
wherein the inside connecting body is a belt-like connecting body.

6. The anti-skid device for tires as recited in claim 4,
wherein the inside connecting body is length adjustable.

7. The anti-skid device for tires as recited in claim 1, further comprising an outside connecting body that is connected with the outside front connecting part or the outside rear connecting part.

8. The anti-skid device for tires as recited in claim 7,
wherein the outside connecting body is a belt-like connecting body.

9. The anti-skid device for tires as recited in claim 7,
wherein the outside connecting body is length adjustable.

10. The anti-skid device for tires as recited in claim 1, further comprising a connectable/disconnectable connector that has one end part connected with the outside front connecting part and other end part connected with the outside rear connecting part.

11. The anti-skid device for tires as recited in claim 1, wherein the first ground-contactable sheet-like part or the second ground-contactable sheet-like part comprises an anti-skid protrusion or an anti-skid piece at an outer circumferential surface.

12. The anti-skid device for tires as recited in claim 1, wherein the first ground-contactable sheet-like part or the second ground-contactable sheet-like part comprises an engaging protrusion or an engaging piece at an inner circumferential surface.

13. The anti-skid device for tires as recited in claim 1, wherein the first main body or the second main body is made of rubber or resin.

14. The anti-skid device for tires as recited in claim 13, wherein each of the first main body and the second main body comprises an integrally molded body of the rubber or the resin.

15. The anti-skid device for tires as recited in claim 1, comprising first and second elementary units,
wherein each of the first and the second elementary units is configured such that the first main body and the second main body are connected with each other via the inside rear connecting part and the inside front connecting part,
wherein the first and the second elementary units are connected with one another such that the outside front connecting part of the first adjacent elementary unit is connected with the outside rear connecting part of the second elementary unit.

16. A main body for an anti-skid device for tires, wherein the main body is one of the first main body and the second main body as recited in claim 1.

17. The anti-skid device for tires as recited in claim 1, wherein the first ground-contactable sheet-like part has a larger thickness than the first outside sheet-like part.

18. The anti-skid device for tires as recited in claim 1, wherein the second ground-contactable sheet-like part has a larger thickness than the second inside sheet-like part.

19. The anti-skid device for tires as recited in claim 1, wherein the second ground-contactable sheet-like part has a larger thickness than the second outside sheet-like part.

20. An anti-skid device for tires comprising:
a first main body; and
a second main body disposed rearward of the first main body, the first main body and second main body are made of an elastic material;
wherein the first main body comprises: a first ground-contactable sheet-like part that elongates in a circumferential direction; a first inside rear connecting part that merges into the first ground-contactable sheet-like part at a rear side of the first ground-contactable sheet-like part and an inside of the first ground-contactable sheet-like part; and a first outside front connecting part that merges into the first ground-contactable sheet-like part at an outside of the first ground-contactable sheet-like part and a front side of the first ground-contactable sheet-like part,
wherein the second main body comprises: a second ground-contactable sheet-like part that elongates in the circumferential direction; a second inside front connecting part that merges into the second ground-contactable sheet-like part and is arranged at an inside of the second ground-contactable sheet-like part and a front side of the second ground-contactable sheet-like part; and a second outside rear connecting part that merges into the second ground-contactable sheet-like part at an outside of the second ground-contactable sheet-like part and a rear side of the second ground-contactable sheet-like part,
wherein the first main body comprises: a first inside sheet-like part that merges into an inside shoulder part of the first ground-contactable sheet-like part and elongates in the circumferential direction; and a first outside sheet-like part that merges into an outside shoulder part of the first ground-contactable sheet-like part and elongates in the circumferential direction, wherein the first main body has a cross-section that is approximately U-shaped,
wherein the second main body comprises: a second inside sheet-like part that merges into an inside shoulder part of the second ground-contactable sheet-like part and elongates in the circumferential direction; and a second outside sheet-like part that merges into an outside shoulder part of the second ground-contactable sheet-like part and elongates in the circumferential direction, wherein the second main body has a cross-section that is approximately U-shaped,
wherein the first inside rear connecting part and the second inside front connecting part are connectable with each other;
wherein the first main body comprises a first outside rear connecting part that merges into the first ground-contactable sheet-like part at a rear side of the first ground-contactable sheet-like part and an outside of the first ground-contactable sheet-like part; and a first inside front connecting part that merges into the first ground-contactable sheet-like part at an inside of the first ground-contactable sheet-like part and a front side of the first ground-contactable sheet-like part; and
the second main body comprises a second outside front connecting part that merges into the second ground-contactable sheet-like part and is arranged at an outside of the second ground-contactable sheet-like part and a front side of the second ground-contactable sheet-like part; and a second inside rear connecting part that merges into the second ground-contactable sheet-like part at an inside of the second ground-contactable sheet-like part and a rear side of the second ground-contactable sheet-like part.

21. The anti-skid device for tires as recited in claim 20, wherein the inside rear connecting part is provided at a rear part of the first inside sheet-like part,
wherein the outside front connecting part is provided at a front part of the first outside sheet-like part,
wherein the inside front connecting part is provided at a front part of the second inside sheet-like part,
wherein the outside rear connecting part is provided at a rear part of the second outside sheet-like part.

22. The anti-skid device for tires as recited in claim 20, wherein the first main body comprises: an inside rear extending portion that extends rearward with respect to the first ground-contactable sheet-like part; and an outside front extending portion that extends frontward with respect to the first ground-contactable sheet-like part,
wherein the second main body comprises: an inside front extending portion that extends frontward with respect to the second ground-contactable sheet-like part; and an outside rear extending portion that extends rearward with respect to the second ground-contactable sheet-like part,
wherein the inside rear connecting part is provided at the inside rear extending portion, wherein the outside front connecting part is provided at the outside front extending portion,
wherein the inside front connecting part is provided at the inside front extending portion,
wherein the outside rear connecting part is provided at the outside rear extending portion.

\* \* \* \* \*